(12) United States Patent
Zhang

(10) Patent No.: US 12,012,073 B2
(45) Date of Patent: Jun. 18, 2024

(54) APPARATUS AND METHOD FOR CONTROLLING VEHICLE LOCK AND VEHICLE

(71) Applicant: BEIJING QISHENG SCIENCE AND TECHNOLOGY CO., LTD., Beijing (CN)

(72) Inventor: Weidong Zhang, Beijing (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 197 days.

(21) Appl. No.: 17/455,228

(22) Filed: Nov. 17, 2021

(65) Prior Publication Data

US 2022/0073033 A1    Mar. 10, 2022

Related U.S. Application Data

(63) Continuation of application No. PCT/CN2020/090717, filed on May 17, 2020.

(30) Foreign Application Priority Data

May 17, 2019 (CN) .......................... 201910412316.4
May 24, 2019 (CN) .......................... 201910440888.3

(51) Int. Cl.
*B60R 25/32* (2013.01)
*B60R 25/10* (2013.01)
(Continued)

(52) U.S. Cl.
CPC .......... *B60R 25/32* (2013.01); *B60R 25/1018* (2013.01); *B60R 25/102* (2013.01); *B60R 25/24* (2013.01); *B62H 5/00* (2013.01)

(58) Field of Classification Search
CPC ... B60R 25/32; B60R 25/1018; B60R 25/102; B60R 25/24; B62H 5/00
See application file for complete search history.

(56) References Cited

U.S. PATENT DOCUMENTS 6,036,214 A * 3/2000 Ono ........................ B62H 5/005
                                                              280/297
6,152,847 A * 11/2000 Matsuo ..................... B62H 5/08
                                                              475/158

(Continued)

FOREIGN PATENT DOCUMENTS

CN   103991428 A   8/2014
CN   105882823 A   8/2016

(Continued)

OTHER PUBLICATIONS

International Search Report in PCT/CN2020/090717 mailed on Aug. 18, 2020, 7 pages.

(Continued)

*Primary Examiner* — Thomas D Alunkal
(74) *Attorney, Agent, or Firm* — METIS IP LLC

(57) ABSTRACT

An apparatus and method for controlling a vehicle lock and a vehicle may be provided. The apparatus may include a main control circuit and a switch lock execution component. The main control circuit may be configured to determine a movement speed of the vehicle when the vehicle is in an unlocked state and is moved illegally. The main control circuit may be also configured to power on the switch lock execution component and control the switch lock execution component to lock a vehicle lock when the movement speed is greater than zero and less than a preset threshold. The switch lock execution component may be configured to execute a locking operation under control of the main control circuit after the switch lock execution component is powered on. According to the present disclosure, when the (Continued)

vehicle is moved illegally and the movement speed of the vehicle is greater than zero and less than the preset threshold, then locking operation may be executed so as to reduce a probability of occurrence of a dangerous accident.

20 Claims, 11 Drawing Sheets

(51) Int. Cl.
 *B60R 25/102* (2013.01)
 *B60R 25/24* (2013.01)
 *B62H 5/00* (2006.01)

(56) References Cited

U.S. PATENT DOCUMENTS

| | | | |
|---|---|---|---|
| 9,228,377 B1* | 1/2016 | Chang | B62H 5/00 |
| 10,450,021 B2* | 10/2019 | Anuth | B62H 5/147 |
| 2010/0225458 A1* | 9/2010 | Jow | B62H 5/20 |
| | | | 340/432 |
| 2016/0063782 A1* | 3/2016 | Yu | B62J 45/20 |
| | | | 340/5.61 |
| 2017/0334522 A1* | 11/2017 | Zahid | H04W 4/029 |
| 2019/0047647 A1* | 2/2019 | Lee | E05B 47/0002 |
| 2019/0202403 A1* | 7/2019 | Taljaard | B60R 25/20 |

FOREIGN PATENT DOCUMENTS

| | | |
|---|---|---|
| CN | 106335572 A | 1/2017 |
| CN | 106504544 A | 3/2017 |
| CN | 106600391 A | 4/2017 |
| CN | 106600782 A | 4/2017 |
| CN | 106672120 A | 5/2017 |
| CN | 106926918 A | 7/2017 |
| CN | 107489317 A | 12/2017 |
| CN | 107527498 A | 12/2017 |
| CN | 207051971 U | 2/2018 |
| CN | 107767660 A | 3/2018 |
| CN | 108053560 A | 5/2018 |
| CN | 207319320 U | 5/2018 |
| CN | 108564685 A | 9/2018 |
| CN | 208021587 U | 10/2018 |
| CN | 108734965 A | 11/2018 |
| CN | 208165150 U | 11/2018 |
| CN | 109515564 A | 3/2019 |
| CN | 109523730 A | 3/2019 |
| CN | 109733512 A | 5/2019 |

OTHER PUBLICATIONS

Written Opinion in PCT/CN2020/090717 mailed on Aug. 18, 2020, 10 pages.
First Office Action in Chinese Application No. 201910412316.4 mailed on Oct. 14, 2021, 28 pages.
First Office Action in Chinese Application No. 201910440888.3 mailed on Jul. 9, 2021, 24 pages.
First Office Action in Chinese Application No. 202080036860.4 mailed on Jul. 19, 2022, 30 pages.

* cited by examiner

APPARATUS AND METHOD FOR CONTROLLING VEHICLE LOCK AND VEHICLE

CROSS-REFERENCE TO RELATED APPLICATIONS

This application is a Continuation of International Application No. PCT/CN2020/090717 filed on May 17, 2020, which claims priority to China Patent Application No. 201910412316.4 filed on May 17, 2019, and China Patent Application No. 201910440888.3 filed on May 24, 2019, the entire contents of which are hereby incorporated by reference.

TECHNICAL FIELD

The present disclosure relates to the technical field of vehicle lock control, and in particular, to an apparatus and method for controlling vehicle lock and a vehicle.

BACKGROUND

Bike sharing refers to that companies provide bicycle/bike sharing services in campuses, subway stations, bus stations, residential areas, commercial districts, public service areas, etc. It is a time-sharing leasing model, which maximizes the efficiency of using existing resources and provides a new type of sharing economy for the purpose of cost saving, environmental protection, and resource sharing.

In order to protect vehicle resources and improve the vehicle use experience of a user at the same time, some smart vehicle locking schemes have been proposed. However, according to some smart vehicle locking schemes, vehicle locking can be triggered when the user is riding the vehicle, and consequently dangerous accidents can occur. In addition, when the user finishes riding, he/she needs to manually complete a locking operation. In existing technology, in order to improve user experience, it is proposed that a vehicle lock is made to complete a locking operation by sending a vehicle return instruction to the vehicle through a user terminal. According to the vehicle return method described above, a situation that because of misjudgment of a vehicle return demand, dangerous accidents due to sudden locking operation may occur.

SUMMARY

According to an aspect of the present disclosure, an apparatus for controlling a vehicle lock may be provided. The apparatus may include a main control circuit and a switch lock execution component. The main control circuit may be configured to determine a movement speed of a vehicle when the vehicle is in an unlocked state and is moved illegally, and power on a switch lock execution component and control the switch lock execution component to lock a vehicle lock when the movement speed is greater than zero and less than a preset threshold. The switch lock execution component may be configured to execute a locking operation under control of the main control circuit after the switch lock execution component is powered on.

In some embodiments, the movement speed of the vehicle may be determined via a positioning device.

In some embodiments, the main control circuit may be further configured to power off the switch lock execution component if information indicating that the vehicle lock has been locked sent by the switch lock execution component is received after the switch lock execution component is controlled to lock the vehicle lock. The switch lock execution component may be further configured to send the information indicating that the vehicle lock has been locked to the main control circuit when the vehicle is in a locked state after the locking operation is executed.

In some embodiments, the main control circuit may be further configured to report power-off failure information if the switch lock execution component cannot be powered off within a set duration after the information indicating that the vehicle lock has been locked sent by the switch lock execution component is received.

In some embodiments, the main control circuit may be further configured to report locking failure information if information indicating that the vehicle lock cannot be locked sent by the switch lock execution component is received after the switch lock execution component is controlled to lock the vehicle lock. The switch lock execution component may be further configured to send the information indicating that the vehicle lock cannot be locked to the main control circuit when the vehicle is still in the unlocked state after the locking operation is executed.

In some embodiments, the main control circuit may be further configured to power on the switch lock execution component and issue an unlocking instruction when a vehicle use request sent by a user terminal is received. The main control circuit may be further configured to verify identity information of a user carried in the vehicle use request after information indicating that the vehicle lock is currently in the unlocked state sent by the switch lock execution component is received. The main control circuit may be further configured to keep the vehicle in the unlocked state and record that the vehicle is in a legal riding state after the verification of identity information of the user passes. The switch lock execution component may be further configured to detect whether the vehicle lock is in the locked state or the unlocked state after the unlocking instruction is received. In response to determining that the vehicle lock is in the unlocked state, the switch lock execution component may be further configured to send the information indicating that the vehicle lock is currently in the unlocked state to the main control circuit. In response to determining that the vehicle lock is in the locked state, the switch lock execution component may be further configured to send information indicating that the vehicle lock is in the unlocked state to the main control circuit after the vehicle lock is controlled to be unlocked.

In some embodiments, the main control circuit may be further configured to report unlocking failure information when information indicating that the vehicle lock cannot be unlocked sent by the switch lock execution component is received after the switch lock execution component is powered on and the unlocking instruction is issued. In response to determining that the vehicle lock is in the locked state, the switch lock execution component may be further configured to send the information indicating that the vehicle lock cannot be unlocked to the main control circuit if the vehicle lock is still in the locked state after the unlocking operation is executed.

In some embodiments, the main control circuit may be further configured to power off the switch lock execution component after the vehicle is in the legal riding state, and report power-off failure information if the switch lock execution component cannot be powered off within a set duration.

In some embodiments, the main control circuit may be further configured to record that a user returns the vehicle successfully and keep the vehicle in the unlocked state if the movement speed of the vehicle is zero after a vehicle return instruction sent by the user terminal to the vehicle is received.

In some embodiments, the main control circuit may be further configured to record that the vehicle is in a riding state and keep the vehicle in the unlocked state if the movement speed of the vehicle is not zero after the vehicle return instruction sent by the user terminal to the vehicle is received.

According to another aspect of the present disclosure, a method for controlling a vehicle lock may be provided. The method may include determining a movement speed of a vehicle when the vehicle is in an unlocked state and is moved illegally. The method may also include executing a locking operation for a vehicle lock when the movement speed is greater than zero and less than a preset threshold.

According to yet another aspect of the present disclosure, an apparatus for controlling a vehicle lock may be provided. The apparatus may include a main control circuit and a switch lock execution component. The main control circuit may be configured to power on a switch lock execution component of a current vehicle after a vehicle return instruction sent by a user terminal to the current vehicle is received, and control the switch lock execution component to lock a vehicle lock and record that a user returns the current vehicle successfully when a wheel moving rotation speed detection result detected by the switch lock execution component is that the current vehicle does not have a wheel moving rotation speed. The switch lock execution component may be configured to detect whether the current vehicle has the wheel moving rotation speed and transmit a detection result to the main control circuit after the switch lock execution component is powered on.

In some embodiments, in response to determining that the current vehicle has the wheel moving rotation speed, the main control circuit may be further configured to record that the current vehicle is in a riding state and keep the current vehicle in an unlocked state after the switch lock execution component of the current vehicle is powered on.

In some embodiments, the main control circuit may be further configured to power off the switch lock execution component after that the current vehicle is in the riding state is recorded, and report power-off failure information if the switch lock execution component cannot be powered off within a set duration.

In some embodiments, the main control circuit may be further configured to power off the switch lock execution component if information indicating that a vehicle lock has been locked sent by the switch lock execution component is received after the switch lock execution component is controlled to lock the vehicle lock. The switch lock execution component may be further configured to send the information indicating that the vehicle lock has been locked to the main control circuit when the current vehicle is in a locked state after a locking operation is executed.

In some embodiments, the main control circuit may be further configured to report power-off failure information if the switch lock execution component cannot be powered off within a set duration after the information indicating that the vehicle lock has been locked sent by the switch lock execution component is received.

In some embodiments, the main control circuit may be further configured to report locking failure information if information indicating that the vehicle lock cannot be locked sent by the switch lock execution component is received after the switch lock execution component is controlled to lock the vehicle lock. The switch lock execution component may be further configured to send the information indicating that the vehicle lock cannot be locked to the main control circuit when the vehicle is still in the unlocked state after the locking operation is executed.

In some embodiments, the main control circuit may be further configured to power on the switch lock execution component and issue an unlocking instruction when a vehicle use request sent by the user terminal is received, verify identity information of a user carried in the vehicle use request after information indicating that the vehicle lock is currently in the unlocked state sent by the switch lock execution component is received, keep the current vehicle in the unlocked state and recording that the current vehicle is in a legal riding state after the verification of the identity information of the user passes. The switch lock execution component may be further configured to control the vehicle lock to be unlocked after the unlocking instruction is received, and send information indicating that the vehicle lock is in the unlocked state to the main control circuit.

In some embodiments, the main control circuit may be further configured to report unlocking failure information if information indicating that the vehicle lock cannot be unlocked sent by the switch lock execution component is received after the switch lock execution component is powered on and the unlocking instruction is issued. The switch lock execution component may be further configured to send the information indicating that the vehicle lock cannot be unlocked to the main control circuit if the vehicle lock is in the locked state after the unlocking operation is executed.

In some embodiments, the main control circuit may be further configured to power off the switch lock execution component after the current vehicle is in the legal riding state, and report the power-off failure information if the switch lock execution component cannot be powered off within a set duration.

In some embodiments, the main control circuit may be further configured to power on the switch lock execution component when the verification of the identify information of the user does not pass, and control the switch lock execution component to lock the vehicle lock when a wheel moving rotation speed detection result detected by the switch lock execution component is that a wheel moving rotation speed value of the current vehicle is less than a preset threshold.

According to yet another aspect of the present disclosure, a method for controlling a vehicle lock may be provided. The method may include determining whether a current vehicle has a wheel moving rotation speed after a vehicle return instruction sent by a user terminal to the current vehicle is received. In response to determining that the current vehicle does not has the wheel moving rotation speed, the method may include controlling a switch lock execution component to execute a locking operation for a vehicle lock, and recording that a user returns a vehicle successfully.

According to yet another aspect of the present disclosure, a vehicle provided with the apparatus for controlling a vehicle lock may be provided.

According to the apparatus and method for controlling a vehicle lock and the vehicle of the present disclosure, after the vehicle return instruction sent by the user terminal to the current vehicle is received, the main control circuit in the apparatus may firstly power on the switch lock execution component of the current vehicle, then control the switch lock execution component to lock the vehicle lock when the wheel moving rotation speed detection result detected by the switch lock execution component is that the current vehicle has no wheel moving rotation speed, and record that the user returns the vehicle successfully. Here, the main control circuit may first determine that there is no wheel moving rotation speed before that the user returns the vehicle successfully is recorded, which may avoid a situation that a vehicle return instruction is sent out because the user touches a vehicle return key on the user terminal by mistake in a riding process. Thus, the embodiments of the present disclosure improve the accuracy of recording that the user returns the vehicle, so that the probability of occurrence of the dangerous accident caused by misjudging a vehicle return success is reduced.

BRIEF DESCRIPTION OF THE DRAWINGS

In order to explain the technical solutions of the embodiments of the present disclosure more clearly, the following will briefly introduce the drawings that need to be used in the embodiments. It should be understood that the following drawings only show certain embodiments of the present disclosure, and therefore should not be regarded as a limitation to the scope. For those of ordinary skill in the art, without creative work, other related drawings can also be obtained based on these drawings.

DETAILED DESCRIPTION

Figure 1:
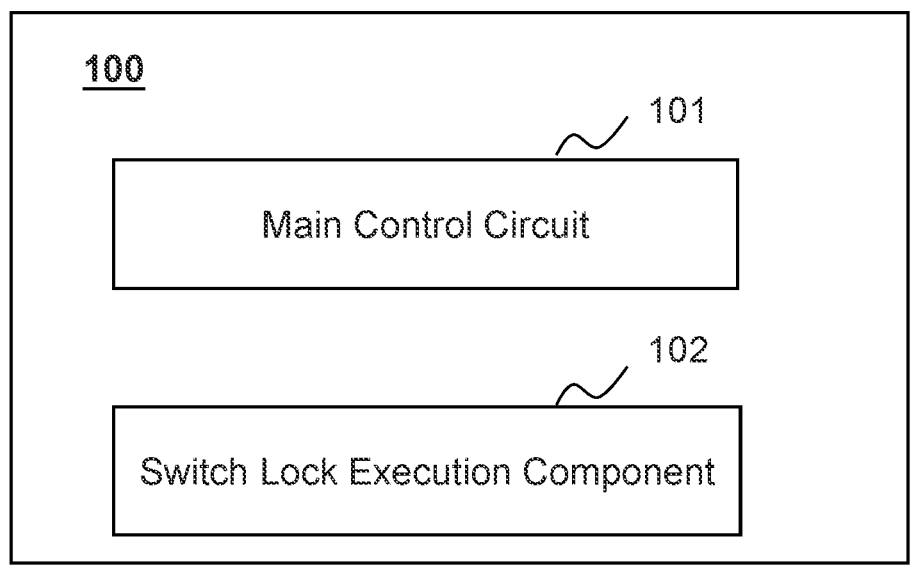
FIG. 1 is a structural schematic diagram of an exemplary apparatus for controlling a vehicle lock according to some embodiments of the present disclosure.

In order to make the purpose, technical solutions and advantages of the embodiments of the present disclosure clearer, the following will clearly and completely describe the technical solutions in the embodiments of the present disclosure in conjunction with the drawings in the embodiments of the present disclosure. It should be understood that the drawings in the present disclosure only serve the purpose of illustration and description, and are not used to limit the protection scope of the present disclosure. In addition, it should be understood that the schematic flowcharts are not drawn according to a real object proportion. The flowcharts used in the present disclosure show operations implemented according to some embodiments of the present disclosure. It should be understood that the operations of the flowcharts may be implemented out of order, and steps without logical context relations may be reversed in order or implemented at the same time. In addition, under the guidance of the content of the present disclosure, those skilled in the art can add one or more other operations to the flowcharts, or remove one or more operations from the flowcharts.

In addition, the described embodiments are only a part of the embodiments of the present disclosure, rather than all of the embodiments. Components of the embodiments of the present disclosure generally described and shown in the drawings herein may be arranged and designed in various different configurations. Therefore, the following detailed description of the embodiments of the present disclosure provided in the accompanying drawings is not intended to limit the scope claimed to be protected of the present disclosure, but merely represents selected embodiments of the present disclosure. Based on the embodiments of the present disclosure, all other embodiments obtained by those skilled in the art without creative work shall fall within the protection scope of the present disclosure.

In order to enable those skilled in the art to use the content of the present disclosure, in conjunction with a specific application scenario "shared bicycle usage scenario," the following implementation manners are given. For those skilled in the art, without departing from the spirit and scope of the present disclosure, the general principles defined here can be applied to other embodiments and application scenarios. Although the present disclosure mainly focuses on the use scenario of shared bicycles for description, it should be understood that this is only an exemplary embodiment.

It should be explained that the term "including" will be used in the embodiments of the present disclosure to indicate the existence of the features declared thereafter, but it does not exclude the addition of other features.

In order to make it more convenient for users to use the shared bicycles, the shared bicycle can remain an unlocked state after legal use ends. When a next user needs to ride the shared bicycle, the user may be allowed to ride if it is verified that identity information of a user is legal, a frequent unlocking and locking procedure may be not needed. However, this way may also bring certain defects, that is, some illegal riding situations may occur, that is, no vehicle using request is sent out or identify verification does not pass, vehicle locking can be performed after detecting that the shared bicycle is moved illegally in this case. This case may be caused by normal operation and maintenance of the shared bicycle or a sudden change of an environment, and sudden forced locking operation may bring a dangerous accident to a rider. Based on this, some embodiments of the present disclosure proposes the following technical solutions which can take into account protection of vehicle resources and the vehicle use safety of the users.

In addition, in order to make it more convenient for the users to use the shared bicycle, for example, at a situation that the user needs to manually lock the vehicle after the riding is finished, if the user remembers that he/she forgets to lock the vehicle after leaving the vehicle for a certain distance after the riding is finished, he/she needs to return to the vehicle to lock the vehicle and confirm vehicle return, which is not convenient. Through improvements, the user may send a vehicle return instruction via vehicle use software on a mobile phone, so that the user may end vehicle use. However, this kind of vehicle return method has a problem, that is, if in a normal riding process, the user accidentally touches a vehicle return key on the vehicle use software, it may result in a vehicle return success, but the user does not know that vehicle return has been successful. In this case, if the vehicle is forced to lock the vehicle, a dangerous event may occur to the user. In order to avoid this case, some embodiments of the present disclosure provide an apparatus for controlling a vehicle lock to solve the above-mentioned problems. The following embodiments will describe the apparatus for controlling a vehicle lock in detail.

FIG. 1 is a structural schematic diagram of an exemplary apparatus 100 for controlling a vehicle lock according to some embodiments of the present disclosure. As shown in FIG. 1, the apparatus 100 may include a main control circuit 101 and a switch lock execution component 102.

The main control circuit 101 may be configured to determine a movement speed of a vehicle when the vehicle is in an unlocked state and is moved illegally. The main control circuit 101 may be configured to power on the switch lock execution component 102 and control the switch lock execution component 102 to lock a vehicle lock when the movement speed is greater than zero and less than a preset threshold. In some embodiments, the main control circuit 101 may be also configured to power on the switch lock execution component 102 of a current vehicle after a vehicle return instruction sent by a user terminal to the current vehicle is received. The main control circuit 101 may be further configured to control the switch lock execution component 102 to lock a vehicle lock and record that a user returns the vehicle successfully when a wheel moving rotation speed detection result detected by the switch lock execution component 102 is that the current vehicle has no wheel moving rotation speed.

The switch lock execution component 102 may be configured to execute a locking operation under control of the main control circuit 101 after the switch lock execution component 102 is powered on. In some embodiments, the switch lock execution component 102 may be further configured to detect whether the current vehicle has a wheel moving rotation speed after the switch lock execution component 102 is powered on, and transmit a detection result to the main control circuit 101.

Here, the main control circuit 101 may refer to a circuit including a processor or a microcontroller, a power supply, or other components, and having a processing and control unit. The main control circuit 101 in some embodiments of the present disclosure may communicate with the user terminal and control the switch lock execution component 102.

In some embodiments, after the vehicle return instruction sent by the user terminal to the vehicle is received and the movement speed of the vehicle is greater than zero and less than the preset threshold, the main control circuit 101 may be configured to power on the switch lock execution component 102 of the vehicle, that is, wake up the switch lock execution component 102, so that the switch lock execution component 102 may enter a working state from a dormant state. In some embodiments, after the vehicle return instruction sent by the user terminal to the current vehicle is received, the main control circuit 101 may power on the switch lock execution component 102 of the current vehicle, that is, wake up the switch lock execution component 102, so that the switch lock execution component 102 may enter a working state from a dormant state.

The switch lock execution component 102 described in some embodiments of the present disclosure may include a gate lock circuit. When the main control circuit 101 powers on the gate lock circuit, it may enter a working state and perform an unlocking operation or a locking operation.

In some embodiments, the main control circuit 101 may determine movement of the vehicle and a movement speed of the vehicle via a positioning device. The positioning device may acquire position information of the vehicle based on one or more positioning technologies of a global positioning system (GPS), a global navigation satellite system (GLONASS), a compass navigation system (COMPASS), a Galileo positioning system, a Qasi-Zenith satellite system (QZSS), a wireless fidelity (WIFI) positioning, a Bluetooth positioning, etc. In some embodiments, the positioning device may be installed in the apparatus for controlling a vehicle lock 100. In some embodiments, the positioning device may also be installed in other parts of the vehicle. The positioning device and the main control circuit 101 may carry out signal transmission. The main control circuit 101 may determine whether a position of the vehicle is moved through the vehicle position information acquired by the positioning device. For example, the main control circuit 101 may determine whether the position of the vehicle is moved based on whether the vehicle position information changes between two or more moments. The main control circuit 101 may also determine the movement speed of the vehicle via the positioning device. For example, the main control circuit 101 may determine the movement speed of the vehicle based on a movement distance of the position of the vehicle between two or more moments, or within a certain period of time.

In some alternative embodiments, the main control circuit 101 may also use other devices to determine the movement and/or movement speed of the vehicle. For example, the vehicle may also be provided with a wheel speed detection device (e.g., a Hall sensor for detecting wheel rotation). The wheel speed detection device may be connected to the main control circuit 101 and send a detected wheel speed signal to the main control circuit 101. The main control circuit 101 may determine the movement speed of the vehicle according to the wheel speed signal detected by the wheel speed detection device.

After the main control circuit 101 determines the movement speed of the vehicle, the main control circuit 101 may further determine whether the movement speed of the vehicle belongs to the above interval, that is, whether it is greater than zero and less than the preset threshold. The preset threshold here may be a safety speed value determined according to multiple tests performed in advance. The wheel moving rotation speed within the safety speed value cannot cause harm to a rider even if the vehicle lock is suddenly locked. For example, the safety speed value may only be a speed value for pushing the vehicle to travel. If the determined movement speed is less than the safety speed value and greater than zero, it can be determined that the vehicle is being ridden illegally, that is, the switch lock execution component 102 may be controlled to lock the vehicle lock.

In some embodiments, the switch lock execution component 102 may include a gate lock circuit and a wheel speed detection circuit. The wheel speed detection circuit here may specifically be a Hall circuit. The Hall circuit may be connected to the gate lock circuit. After the main control circuit 101 powers on the gate lock circuit, the gate lock circuit enters a working state and perform an unlocking operation or a locking operation. In addition, the gate lock circuit may also power on the connected Hall circuit, so that the Hall circuit also enters a working state. After the Hall circuit enters the working state, the Hall circuit may detect whether the current vehicle has a wheel moving rotation speed, and then the Hall circuit may send a detection result to the main control circuit 101 through the gate lock circuit.

Here, the Hall circuit may detect whether the current vehicle has the wheel moving rotation speed in a short time after the Hall circuit is powered on. For example, the Hall circuit may detect whether the current vehicle has the wheel moving rotation speed within 1 second, and send a detection result to the main control circuit 101 through the gate lock circuit, and then the main control circuit 101 may fast determine whether the current vehicle has the wheel moving rotation speed.

Figure 2:
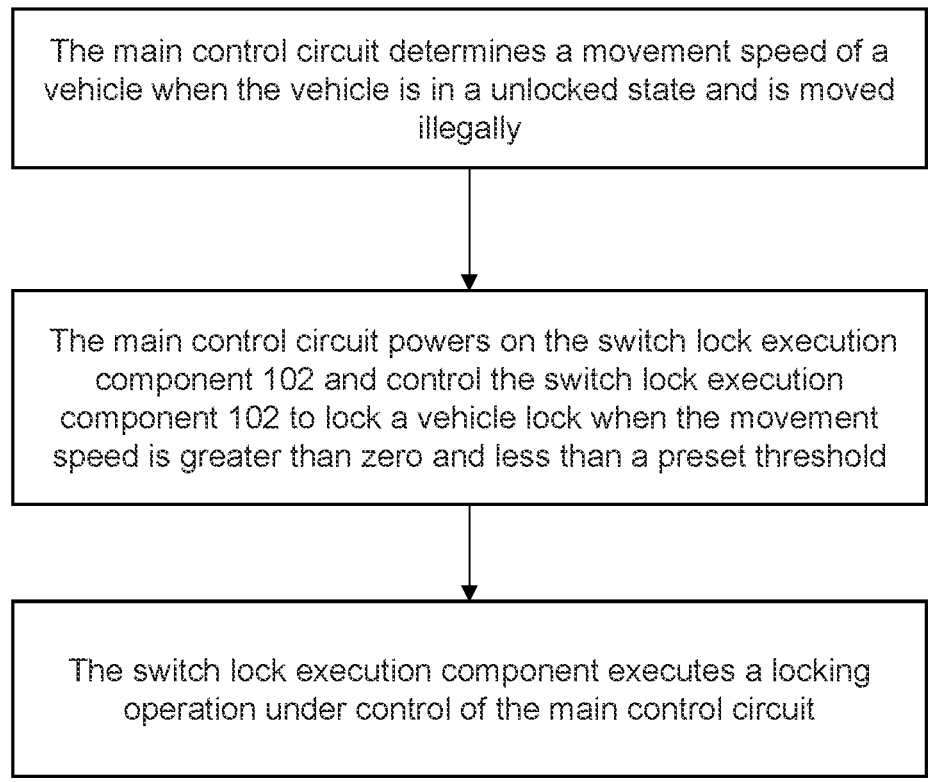
FIG. 2 is a flowchart illustrating an exemplary process for controlling a vehicle lock when a vehicle is moved illegally according to some embodiments of the present disclosure.

FIG. 2 is a flowchart illustrating an exemplary process for controlling a vehicle lock when a vehicle is moved illegally according to some embodiments of the present disclosure. When the main control circuit 101 detects that when a vehicle is in an unlocked state and is illegally moved, the main control circuit 101 may determine a movement speed of the vehicle via the positioning device. Because the state of the vehicle lock does not need to change generally when the vehicle lock is in the unlocked state, in order to save power consumption of electric power, the switch lock execution component 102 may be in a power-off state. Therefore, when the main control circuit 101 determines that the movement speed of the vehicle is greater than zero and less than the preset threshold, the main control circuit 101 generally powers on the switch lock execution component 102, so that the switch lock execution component 102 may enter the working state, and then the main control circuit 101 may control the switch lock execution component 102 to lock the vehicle lock. The switch lock execution component 102 may execute the locking operation under the control of the main control circuit 101, and the vehicle cannot be ridden at this moment.

In the above process, if the main control circuit 101 detects that the vehicle is moved and a vehicle use request is not received within a first set duration, the main control circuit 101 may determine that the vehicle is moved illegally at the movement.

Here, in order to avoid vehicle movement caused by accidental overturning of the vehicle or normal operation and maintenance by operation and maintenance personnel, whether there is a movement speed that lasts for a second set duration may be detected (that is, within the second set duration, the movement speed is greater than zero all the time). if there is a movement speed that lasts for a second set duration, it is considered that the vehicle is ridden illegally. For example, the second set duration is 30 seconds, that is, the vehicle movement speed that lasts for 30 seconds is detected, and it is determined that the vehicle is ridden illegally.

After determining that the movement speed is greater than zero and less than the preset threshold, that is, after the vehicle is ridden illegally, the main control circuit 101 may be further configured to power off the switch lock execution component 102 if information indicating that the vehicle lock has been locked sent by the switch lock execution component 102 is received after the switch lock execution component 102 is controlled to lock the vehicle lock.

The switch lock execution component 102 may be further configured to send the information indicating that the vehicle lock has been locked to the main control circuit 101 when the vehicle is in the locked state after the locking operation is executed.

Here, after the main control circuit 101 determines that the vehicle is ridden illegally, the main control circuit 101 may control the switch lock execution component 102 to lock the vehicle lock by sending a locking operation instruction to the switch lock execution component 102. After the locking operation instruction sent by the main control circuit 101 is received, the switch lock execution component 102 may execute the locking operation. After the locking operation is executed, whether the vehicle has been locked may be detected. If it detects that the vehicle is in the locked state, the switch lock execution component 102 may send the information indicating that the vehicle lock has been locked to the main control circuit 101. Here, the information indicating that the vehicle lock has been locked may be preset digital information. For example, "1" may show that the vehicle lock has been locked, and "0" may show that the vehicle lock is not locked. Here, the information "1" indicating that the vehicle lock has been locked may be sent to the main control circuit 101.

When the main control circuit 101 receives the information "1" indicating that the vehicle lock has been locked, the main control circuit 101 may determine that the switch lock execution component 102 has locked the vehicle lock, that is, the illegal riding state of the vehicle is ended. At this moment, the switch lock execution component 102 is not required to work anymore, in order to save power consumption, the switch lock execution component 102 may be powered off.

The main control circuit 101 may be further configured to report power-off failure information if the switch lock execution component 102 cannot be powered off within a third set duration after the information indicating that the vehicle lock has been locked sent by the switch lock execution component 102 is received.

Here, after the main control circuit 101 controls the switch lock execution component 102 to lock the vehicle lock, if the switch lock execution component 102 cannot be powered off within the third set duration, the main control circuit 101 may determine that a power-off failure may occur, and the power-off failure information may be sent to a background server of the shared bicycle at this moment. Similarly, the power-off failure information here may carry an identification code and geographic position information of the vehicle, so that the background server may notify relevant personnel for maintenance.

The main control circuit 101 may be further configured to report locking failure information if information indicating that the vehicle lock cannot be locked sent by the switch lock execution component 102 is received after the switch lock execution component 102 is controlled to lock the vehicle lock.

The switch lock execution component 102 may be further configured to send the information indicating that the vehicle lock cannot be locked to the main control circuit 101 when it detects that the vehicle is still in the unlocked state after the locking operation is executed.

Herein, it means that when the main control circuit 101 determines that the vehicle is in the illegal riding state, after the switch lock execution component 102 is controlled to lock the vehicle lock, if the information indicating that the vehicle lock cannot be locked sent by the switch lock execution component 102 is received, the main control circuit 101 may determine that the switch lock execution component 102 may have a locking operation failure. In this case, the locking failure information may be sent to the background server, and the locking failure information here may also include an identification code and position information of the vehicle.

Possible reasons for the locking operation failure here may include that the switch lock execution component 102 is damaged and cannot lock the vehicle lock, that the vehicle lock is damaged and cannot be locked by the switch lock execution component 102, or that the switch lock execution component 102 and the vehicle lock are both damaged.

After the main control circuit 101 detects that the vehicle is moved illegally, if it determines that the movement speed of the vehicle is greater than or equal to the preset threshold, or equal to zero, the switch lock execution component 102 may not be operated.

Here, after that the vehicle is moved illegally is detected, the main control circuit 101 may use the positioning device to determine the movement speed of the vehicle. Considering that the positioning device (e.g., a GPS positioning device) has a certain accuracy error, it may not be able to accurately determine the movement speed of the vehicle in a short time, the main control circuit 101 may detect whether there is a movement speed that lasts for the second set duration, such as 30 seconds. If the movement speed that lasts for the second set duration is not detected within 30 seconds, or the movement speed is not detected or the detected movement speed is zero, then it is determined that the movement speed is zero. If the movement speed that lasts for the second set duration is detected and the movement speed is greater than or equal to the preset threshold, the switch lock execution component 102 will not be operated.

Specifically, some cases in which the main control circuit 101 detects that the vehicle is moved illegally and the determined current movement speed of the vehicle is equal to 0, may include one or more following cases.

In some cases, a legal movement caused by normal operation and maintenance, or a short-term displacement caused by environmental changes, such as a short-term displacement caused when a strong wind blows down a vehicle. In these cases, the positioning device cannot detect a continuous movement speed within 30 seconds, or it detects that the movement speed is zero. That is, the vehicle is not ridden illegally and does not need to be locked.

In some cases, the determined vehicle movement speed is greater than or equal to the preset threshold, that is, the current movement speed reaches the safety speed value, although it is determined that the vehicle is ridden illegally at this moment, it is still necessary to protect the rider to the greatest extent, and the locking operation may be still not performed.

Figure 3:
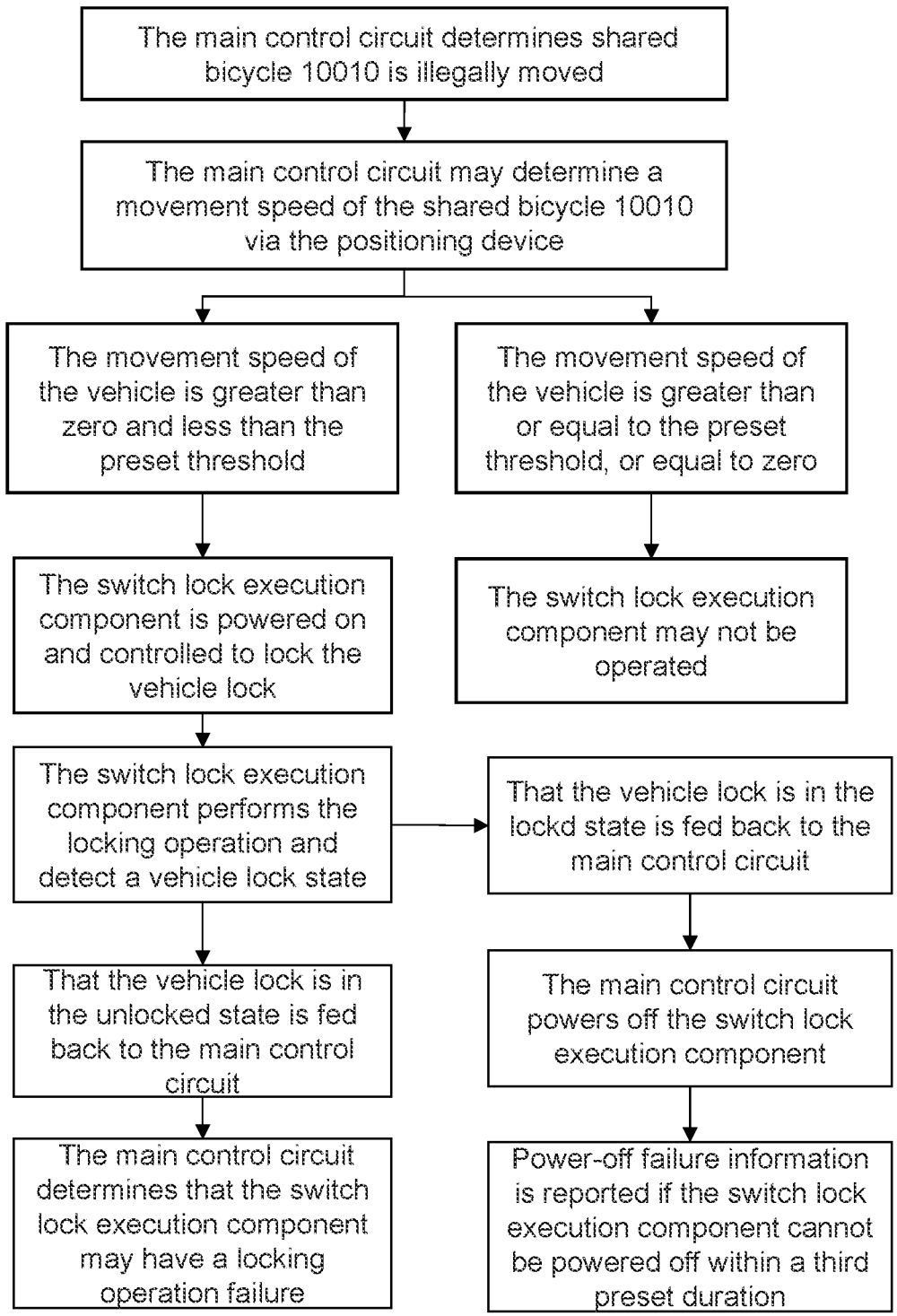
FIG. 3 is a flowchart illustrating an exemplary process for controlling a vehicle lock when a vehicle is moved illegally according to some embodiments of the present disclosure.

FIG. 3 is a flowchart illustrating an exemplary process for controlling a vehicle lock when a vehicle is moved illegally according to some embodiments of the present disclosure. A shared bicycle 10010 may be taken as an example below.

When the main control circuit 101 detects occurrence of position movement of the shared bicycle 10010 in the unlocked state via the positioning device, and does not receive a vehicle use request, the main control circuit 101 may determine that the shared bicycle 10010 is illegally moved. In this case, the main control circuit 101 may determine a movement speed of the shared bicycle 10010 within the second set duration via the positioning device. If the main control circuit 101 determines that the movement speed that lasts for the second set duration is greater than or equal to a preset threshold (i.e., the shared bicycle 10010 is the illegal riding state, but the riding speed exceeds the safety speed), or equal to zero, the main control circuit 101 may not operate the switch lock execution component 102. If the switch lock execution component 102 detects that the shared bicycle 10010 has a continuous movement speed that lasts for the second set duration after the switch lock execution component 102 is powered on, and the movement speed is greater than zero and less than the preset threshold, the main control circuit 101 may determine that the shared bicycle 10010 is in the illegal riding state, and a riding speed value does not reach the safety speed value. At this moment, the main control circuit 101 may power on the switch lock execution component 102, and control the switch lock execution component 102 to lock the vehicle lock. Then switch lock execution component 102 may perform the locking operation and detect a vehicle lock state. When the switch lock execution component 102 detects that the vehicle lock is in the locked state, which may be fed back to the main control circuit 101, the main control circuit 101 may power off the switch lock execution component 102 to save power consumption. If the main control circuit 101 cannot power off the switch lock execution component 102 with the third set duration, the main control circuit 101 may send power-off failure information to the background server. When the switch lock execution component 102 detects that the vehicle lock is in the unlocked state, which may be fed back to the main control circuit 101, the main control circuit 101 may determine that the switch lock execution component 102 has a locking operation failure at this moment, and send locking failure information to the background server.

The above is the control process of the vehicle lock after that the vehicle lock is illegally moved is determined. After that the vehicle is illegally moved is determined, the movement speed of the vehicle needs to be detected again, and only when the movement speed of the vehicle continues to be greater than 0 within the second set duration, that is, the vehicle is ridden illegally, and the movement speed is less than the preset threshold, that is, it does not reach the safety speed value, the vehicle lock may be locked. If the current movement speed is 0 or reaches the safety speed value, the vehicle lock may be not locked, so that for the case that the vehicle is indeed ridden illegally, it may avoid that the rider is harmed due to sudden locking operation, and for the case that the vehicle is not ridden illegally, the vehicle lock is not locked to prevent the switch lock execution component 102 from frequently unlocking and locking the vehicle lock, which may prolong the service life of the switch lock execution component 102 and the vehicle lock, and also facilitate legal riding of a next user.

The above FIG. 3 is a flowchart illustrating an exemplary process for controlling a vehicle lock when a vehicle is moved illegally. The following will describe a process for controlling a vehicle lock after the vehicle use request sent by the user terminal is received. The main control circuit 101 may be further configured to power on the switch lock execution component 102 and issue an unlocking instruction when the vehicle use request sent by the user terminal is received. The main control circuit 101 may verify identity information of a user carried in the vehicle use request after information indicating that the vehicle lock is currently in the unlocked state sent by the switch lock execution component 102 is received. The main control circuit 101 may keep the vehicle in the unlocked state and record that the vehicle is in the legal riding state after the verification of the identity information of the user passes.

The switch lock execution component 102 may be further configured to detect whether the vehicle lock is in the locked state or the unlocked state after the unlocking instruction is received. In response to determining that the vehicle lock is in the unlocked state, the switch lock execution component 102 may send information indicating that the vehicle lock is currently in the unlocked state to the main control circuit 101. In response to determining that the vehicle lock is in the locked state, the switch lock execution component 102 may send information indicating that the vehicle lock is in the unlocked state to the main control circuit 101 after the vehicle lock is controlled to be unlocked.

In some embodiments of the present disclosure, the main control circuit 101 may directly receive the vehicle use request sent by the user terminal, and the user terminal may not need to send the vehicle use request to the background server. In the vehicle use stage, the user terminal may not need to communicate with the background server any more to avoid a situation that a communication network breaks down and cannot perform identity verification, and the identity information of the user is directly verified through the main control circuit 101, which may greatly shorten the verification time for using the vehicle.

The main control circuit 101 may be further configured to power on the switch lock execution component 102 and issue an unlocking instruction, and report unlocking failure information when information indicating that the vehicle lock cannot be unlocked sent by the switch lock execution component 102 is received.

In response to determining that the vehicle lock is in the locked state, the switch lock execution component 102 may be further configured to send the information indicating that the vehicle lock cannot be unlocked to the main control circuit 101 if it detected that the vehicle lock is still in the locked state after the unlocking operation is executed.

The main control circuit 101 may be further configured to power off the switch lock execution component 102 after it determines that the vehicle enters the legal riding state, and report power-off failure information if the switch lock execution component 102 cannot be powered off within the third set duration.

Figure 4:
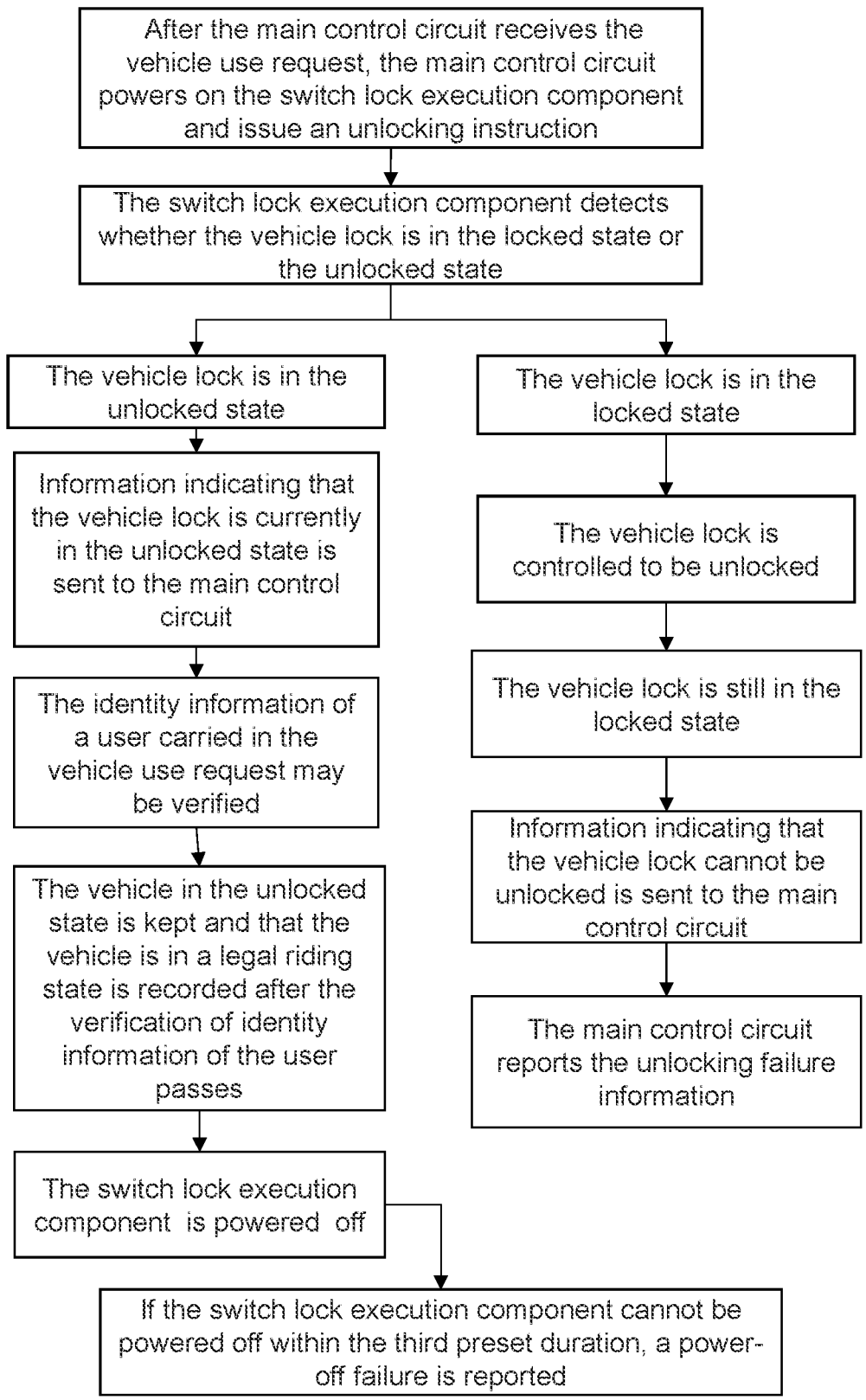
FIG. 4 is a flowchart illustrating an exemplary process for controlling a vehicle lock after a vehicle use request is received according to some embodiments of the present disclosure.

FIG. 4 is a flowchart illustrating an exemplary process for controlling a vehicle lock after a vehicle use request is received according to some embodiments of the present disclosure. The shared bicycle 10010 may be still taken as an example to illustrate the process.

After the main control circuit 101 receives the vehicle use request, that is, it determines that there is a user who wants to use the shared bicycle 10010, the main control circuit 101 may power on the switch lock execution component 102 and issue an unlocking instruction. The switch lock execution component 102 may detect whether the vehicle lock is in the locked state or the unlocked state after the unlocking instruction is received. In response to determining that the vehicle lock is in the unlocked state, the switch lock execution component 102 may send information indicating that the vehicle lock is currently in the unlocked state to the main control circuit 101. In response to determining that the vehicle lock is in the locked state, after the vehicle lock is controlled to be unlocked and it is determined that the vehicle lock has been unlocked, the switch lock execution component 102 may send information indicating that the vehicle lock is in the unlocked state to the main control circuit 101. In response to determining that the vehicle lock is in the locked state, information indicating that the vehicle lock cannot be unlocked may be sent to the main control circuit 101 if it is detected that the vehicle lock is still in the locked state after the vehicle lock is controlled to be unlocked. At this moment, the main control circuit 101 may send the unlocking failure information of the shared bicycle 10010 to the background server. The unlocking failure information may carry an identification code of the shared bicycle 10010 and position information of the shared bicycle.

If the main control circuit 101 receives the information indicating that the vehicle lock is currently in the unlocked state sent by the switch lock execution component 102, it may determine that the shared bicycle 10010 is in a ridable state. When it is determined that the shared bicycle 10010 is in the ridable state, the identity information of a user carried in the vehicle use request may be verified. For example, the identity information of the user may include whether the user is a registered user of this type of shared bicycle and the account balance of the registered user. If the identity information of the user is that the user is the registered user of the shared bicycle, and the corresponding account balance of the registered user is greater than the set value, then it is recorded that the vehicle is in a legal riding state, that is, the user may legally ride the shared bicycle 10010.

After that the shared bicycle 10010 is in the legal riding state is recorded, that is, the user is in a normal riding process, the switch lock execution component 102 does not need to perform a switch lock operation, in order to save power consumption, the switch lock execution component 102 may be powered off. If the switch lock execution component 102 cannot be powered off within the third set duration, such as 15 seconds, a power-off failure may be reported to the background server.

The above process is the control process of the apparatus for controlling a vehicle lock after the vehicle use request of the user is received. The following will describe the execution process after a vehicle return instruction sent by a user terminal to a vehicle is received when the vehicle is in the legal riding state.

The main control circuit 101 may be further configured to determine a movement speed of the vehicle via the positioning device when the vehicle return instruction sent by the user terminal to the vehicle is received. If the movement speed of the vehicle is zero, the main control circuit 101 may record that the user returns the vehicle successfully. After that the user returns the vehicle successfully is recorded, in order to facilitate riding of the next user, the vehicle may be kept in an unlocked state.

The main control circuit 101 may be configured to record that the vehicle is a riding state and keep the vehicle in the unlocked state when the movement speed of the vehicle determined by the positioning device is not zero (that is, there is a movement speed) after the vehicle return instruction sent from the user terminal to the vehicle is received.

In this case, although the main control circuit 101 receives the vehicle return instruction, but it determines that the vehicle still has a movement speed via the positioning device. The main control circuit 101 may determine that the user is still in the riding state, but a vehicle return key on the user terminal is triggered by mistake, and the main control circuit 101 may record that the vehicle is in the riding state at this moment, and not record that the user returns the vehicle successfully.

As described above, after the main control circuit 101 receives the vehicle return instruction, the main control circuit 101 may have two different processing procedures by determining whether the vehicle has a movement speed.

Figure 5:
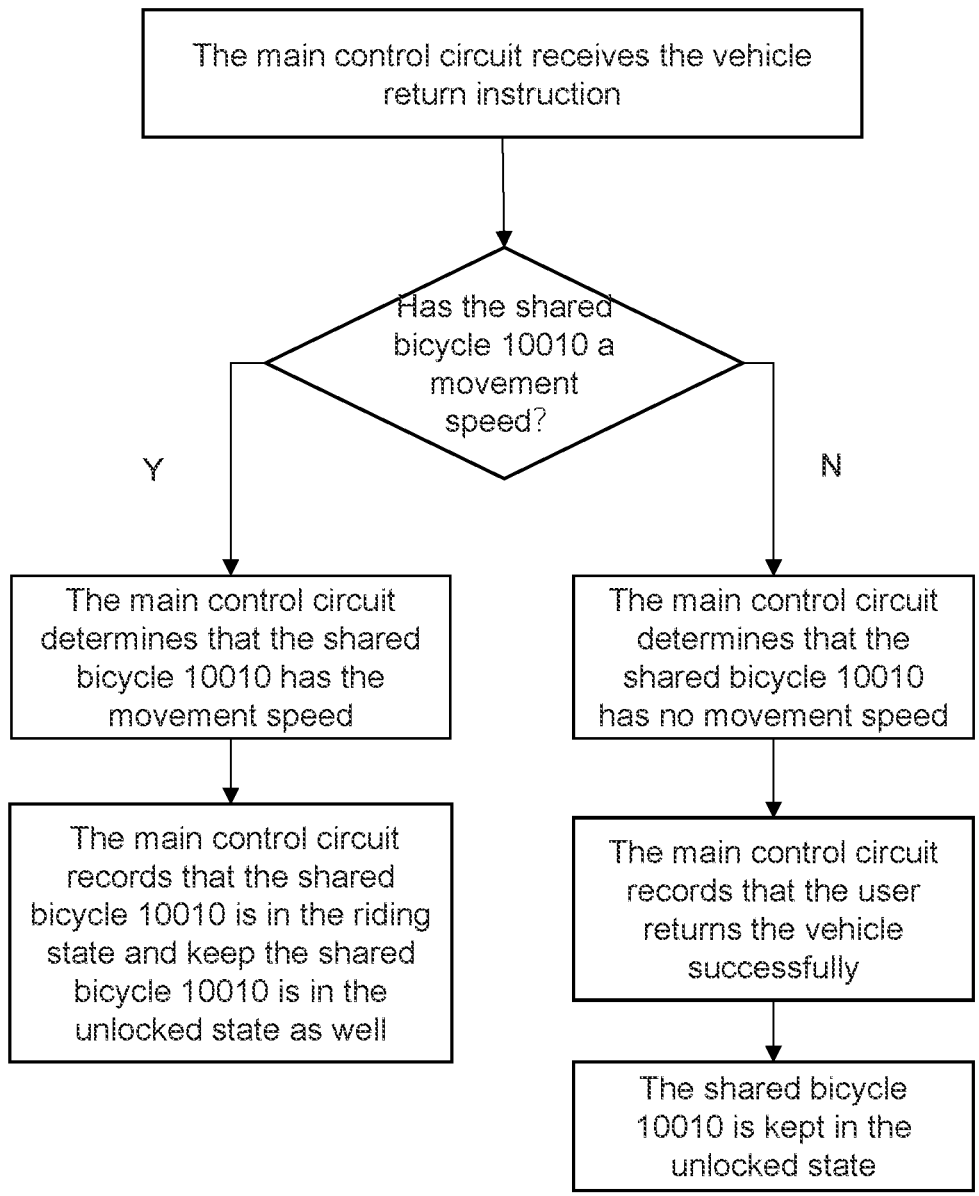
FIG. 5 is a flowchart illustrating an exemplary process for controlling a vehicle lock after a vehicle return instruction is received according to some embodiments of the present disclosure.

FIG. 5 is a flowchart illustrating an exemplary process for controlling a vehicle lock after a vehicle return instruction is received according to some embodiments of the present disclosure. As shown in FIG. 5, taking the vehicle being a shared bicycle as an example, the process may be described in the following specific embodiments.

After the main control circuit 101 of the apparatus 100 on the shared bicycle with the number 10010 receives the vehicle return instruction sent by the user terminal A, it may use the positioning device on the shared bicycle 10010 to determine whether the shared bicycle 10010 has a movement speed. In response to determining that the shared bicycle 10010 has no movement speed, the main control circuit 101 may record that the user returns the vehicle successfully and keep the shared bicycle 10010 in the unlocked state. In response to determining that the shared bicycle 10010 has the movement speed, the main control circuit 101 may record that the shared bicycle 10010 is in the riding state and keep the shared bicycle 10010 is in the unlocked state as well.

In some embodiments of the present disclosure, after the vehicle return instruction is received, the main control circuit 101 may first determine whether the vehicle has a movement speed via the positioning device. In response to determining that there is no movement speed, the main control circuit 101 may record that the vehicle is returned successfully, which may improve accuracy for determining whether the user returns the vehicle, and avoid a case that a dangerous event happens to the user due to sudden vehicle locking after misjudging that the user returns the vehicle.

Figure 6:
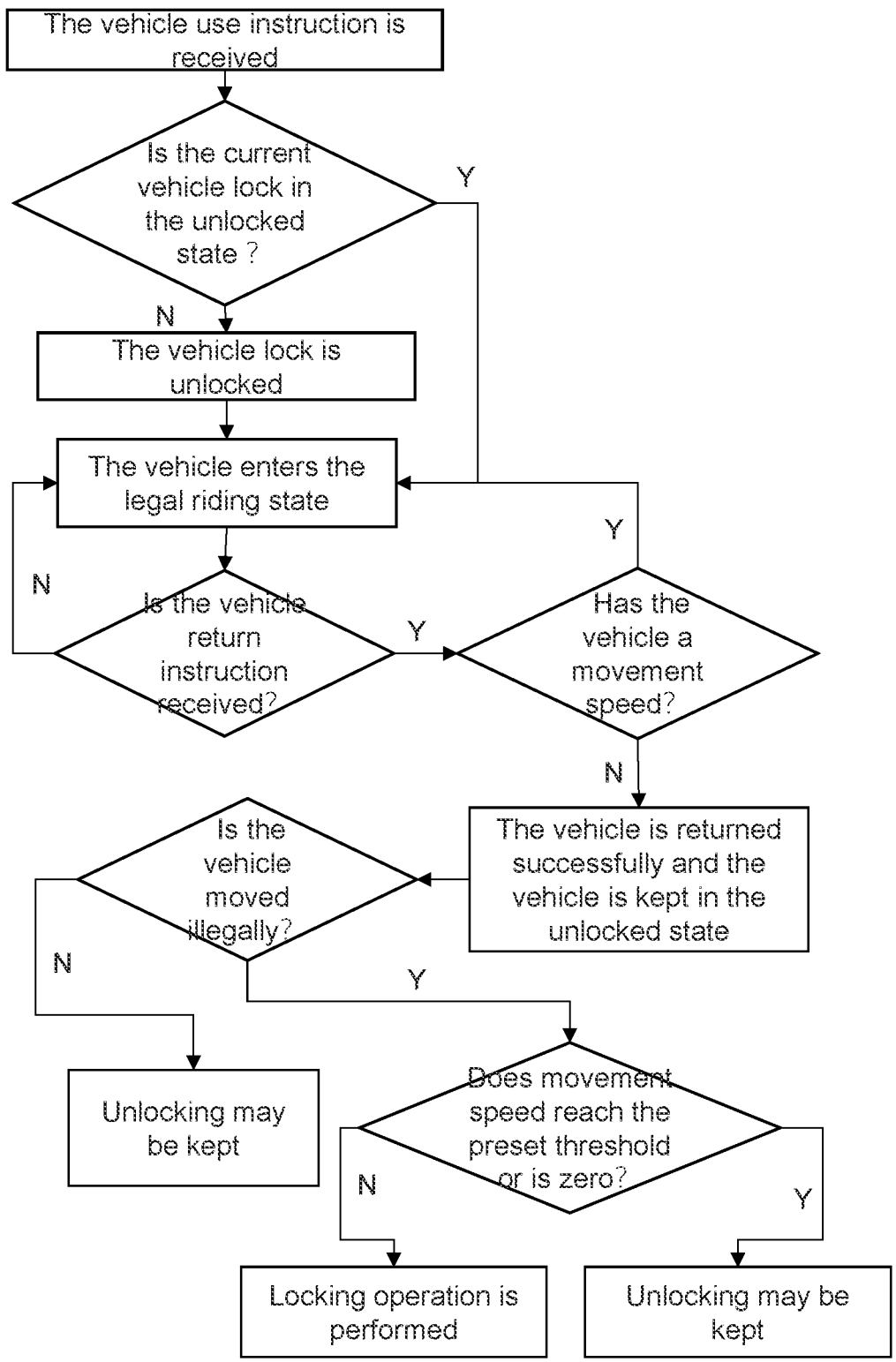
FIG. 6 is a flowchart illustrating an exemplary process for controlling a vehicle lock in a vehicle using process according to some embodiments of the present disclosure.

Some embodiments of the present disclosure describe the process for controlling the vehicle lock after the vehicle use request is received, the process for controlling the vehicle lock after the vehicle return instruction is received, and the process for controlling the vehicle when it is detected that the vehicle is moved illegally. The above overall process may be described below in conjunction with FIG. 6. FIG. 6 is a flowchart illustrating an exemplary process for controlling a vehicle lock in a vehicle using process according to some embodiments of the present disclosure. It is assumed that the identity information of a user is legal in the process.

After the vehicle use instruction is received, whether the current vehicle lock is in the unlocked state or not may be determined. In response to determining that the current vehicle lock is in the unlocked state, it may indicate that the vehicle enters the legal riding state. In response to determining that the current vehicle lock is not in the unlocked state, the vehicle enters the legal riding state after the vehicle lock is unlocked. Then, whether the vehicle return instruction is received may be determined. In response to determining that the vehicle return instruction is received, whether the vehicle has a movement speed or not may be determined. In response to determining that the vehicle has the movement speed, the main control circuit 101 may record that the vehicle is still in the legal riding state. In response to determining that the vehicle has no movement speed, the main control circuit 101 may record that the vehicle is returned successfully and keep the vehicle in the unlocked state. If that the vehicle is moved illegally is detected and the movement speed that continues for the third set duration is detected to be greater than zero and less than the preset threshold after the vehicle is returned successfully, locking operation may be performed. If the detected movement speed reaches the preset threshold or the detected movement speed is zero, unlocking may be kept.

The "first" "second," and "third" in the first set duration, the second set duration, and the third set duration mentioned in the present disclosure are only for distinguishing purposes and do not mean the order of size.

Figure 7:
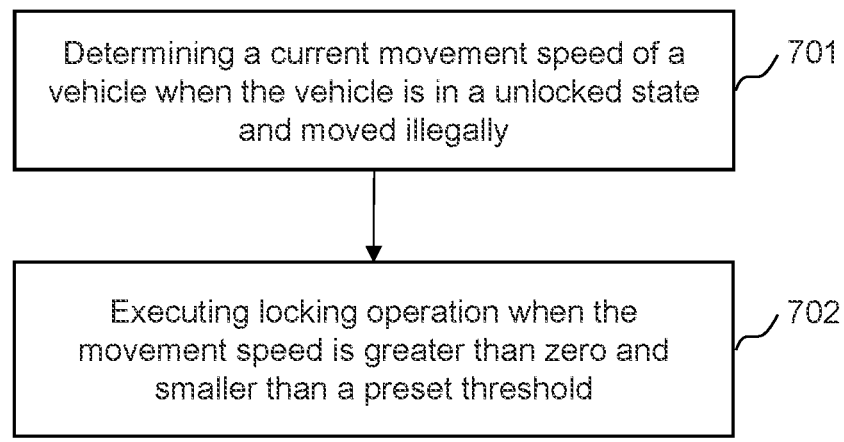
FIG. 7 is a flowchart illustrating an exemplary process for controlling a vehicle lock according to some embodiments of the present disclosure.

Some embodiments of the present disclosure further provide a method for controlling a vehicle lock shown in FIG. 7. FIG. 7 is a flowchart illustrating an exemplary process for controlling a vehicle lock according to some embodiments of the present disclosure.

In 701, a current movement speed of a vehicle may be determined when the vehicle is in an unlocked state and moved illegally.

In 702, locking operation may be executed when the movement speed is greater than zero and smaller than a preset threshold.

In some embodiments, operation 701 may include one or more following operations.

The current movement speed of the vehicle may be determined via a positioning device when it is detected that the vehicle is moved illegally.

In 702, after locking operation is executed, the method for controlling a vehicle lock may further includes one or more following operations.

A switch lock execution component may be powered off.

The vehicle lock may include a main control circuit (e.g., the main control circuit 101) and a switch lock execution component (e.g., the switch lock execution component 102). In the method for controlling a vehicle lock, specifically, the main control circuit in the vehicle lock may determine the movement speed of the vehicle via the positioning device when the vehicle is in the unlocked state and moved illegally. when it determines that the movement speed of the vehicle is greater than zero and smaller than the preset threshold, the main control circuit may power on the switch lock execution component, and control the switch lock execution component to lock the vehicle lock. After the switch lock execution component executes a locking operation, when it is detected that the vehicle is in the locked state, the switch lock execution component may send information indicating that the vehicle lock has been locked to the main control circuit. The main control circuit may receive the information indicating that the vehicle lock has been locked sent by the switch lock execution component, and power off the switch lock execution component.

In some embodiments, the method for controlling a vehicle lock may further include one or more following operations.

Power-off failure information may be reported if the switch lock execution component cannot be powered off within a set duration.

Specifically, after the main control circuit in the vehicle lock receives the information indicating that the vehicle lock has been locked sent by the switch lock execution component, if the switch lock execution component cannot be powered off within a third set duration, the power-off failure information may be reported.

In some embodiments, after locking operation is executed, the method for controlling a vehicle lock further include one or more following operations.

Locking failure information may be reported if the locking operation fails.

Specifically, after the main control circuit in the vehicle lock controls the switch lock execution component to execute the locking operation, if the switch lock execution component detects that the vehicle is still in the unlocked state, the switch lock execution component may send information indicating that the vehicle lock cannot be locked to the main control circuit. When the main control circuit receives the information indicating that the vehicle lock cannot be locked sent by the switch lock execution component, it reports locking failure information.

In some embodiments, the method for controlling a vehicle lock further include one or more following operations.

Whether the vehicle lock is in the locked state or the unlocked state may be determines when a vehicle use request sent by a user terminal is received.

Identity information of a user carried in the vehicle use request may be verified if it is determined that the vehicle lock is in the unlocked state, the vehicle may be keeped in the unlocked state and that the vehicle is in a legal riding state may be recorded after the verification of identity information of the user passes.

An unlocking operation may be executed if it is determined that the vehicle lock is in the locked state.

In some embodiments, the method for controlling a vehicle lock further include one or more following operations.

Unlocking failure information may be reported if it detected that the vehicle lock is still in the locked state after the unlocking operation is executed.

The detecting of whether the vehicle lock is in the locked state or the unlocked state when the vehicle use request sent by the user terminal is received may include one or more following operations. The switch lock execution component may be powered on when the vehicle use request sent by the user terminal is received, and whether the vehicle lock is in the locked state or the unlocked state may be detected through the powered-on switch lock execution component.

The method for controlling a vehicle lock further include one or more following operations.

The switch lock execution component may be power off if it is determined that the vehicle enters the legal riding state. Power-off failure information may be reported if the switch lock execution component cannot be powered off with a set duration.

Specifically, the main control circuit in the vehicle lock may power on the switch lock execution component and issue the unlocking instruction when the vehicle use request sent by the user terminal is received. The switch lock execution component may determine whether the vehicle lock is in the locked state or the unlocked state after the unlocking instruction is received. In response to determining that the vehicle lock is in the unlocked state the switch lock execution component may send information indicating that the vehicle lock is currently in the unlocked state to the main control circuit. In response to determining that the vehicle lock is in the locked state, after the vehicle lock is controlled to be unlocked, the switch lock execution component may send information indicating that the vehicle lock is in the unlocked state to the main control circuit. The main control circuit may verify identity information of a user carried in the vehicle use request after the information indicating that the vehicle lock is currently in the unlocked state sent by the switch lock execution component is received. The main control circuit may keep the vehicle in the unlocked state and record that the vehicle is in a legal riding state after the verification of the identity information of the user passes.

In addition, if the switch lock execution component determines that the vehicle lock is in the locked state, and it detects that the vehicle lock is still in the locked state after the unlocking operation is executed, the switch lock execution component may send the information indicating that the vehicle lock cannot be unlocked to the main control circuit. The main control circuit may report unlocking failure information when the information indicating that the vehicle lock cannot be unlocked sent by the switch lock execution component is received.

In addition, specifically, the main control circuit may power off the switch lock execution component after determining that the vehicle enters the legal riding state, and report power-off failure information if the switch lock execution component cannot be powered off within the third set duration.

In some embodiments, the method for controlling a vehicle lock may further include one or more following operations.

The current movement speed of the vehicle may be determined when a vehicle return instruction sent by the user terminal is received. That a user returns the vehicle successfully may be recorded and keep the vehicle in the unlocked state if the movement speed of the vehicle is zero.

Specifically, the main control circuit in the vehicle lock may determine the current movement speed of the vehicle via the positioning device when the vehicle return instruction sent by the user terminal to the vehicle is received. The main control circuit may record that the user returns the vehicle successfully and keep the vehicle in the unlocked state if the current movement speed of the vehicle is zero.

In some embodiments, when the vehicle return instruction sent by the user terminal is received, after the current movement speed of the vehicle is determined, the method for controlling a vehicle lock may further include one or more following operations.

That the vehicle is in a riding state may be recorded and keep the vehicle in the unlocked state if the movement seed of the vehicle is not zero.

Wherein, the determining of the current movement speed of the vehicle when the vehicle return instruction sent by the user terminal is received may include that the current movement speed of the vehicle is determined via the positioning device when the vehicle return instruction sent by the user terminal is received.

After that the vehicle is in the riding state is recorded, the method for controlling a vehicle lock may further include one or more following operations.

The switch lock execution component may be powered off, and the power-off failure information may be reported if the switch lock execution component cannot be powered off within the third set duration.

Specifically, if the main control circuit 101 in the vehicle lock determines that the current movement speed of the vehicle is not zero via the positioning device after the vehicle return instruction sent by the user terminal to the vehicle is received, it may record that the vehicle is in the riding state and keep the vehicle in the unlocked state.

In addition, after that the vehicle is in the riding state is recorded, the main control circuit in the vehicle lock may power off the switch lock execution component, and report the power-off failure information if the switch lock execution component cannot be powered off within the third set duration.

Another aspect of the present disclosure further provides a vehicle, and the vehicle is provided with the apparatus for controlling a vehicle lock in any embodiment described above.

The vehicle here can be a bicycle, an electric car and other vehicles that can be provided with the apparatus for controlling a vehicle lock mentioned in the above-mentioned embodiment.

The embodiments of the present disclosure provide the apparatus and method for controlling a vehicle lock, and the vehicle. When the main control circuit 101 in the apparatus for controlling a vehicle lock detects that the vehicle is in the unlocked state and moved illegally, it first determines the movement speed of the vehicle. when the main control circuit 101 determines that the movement speed of the vehicle is greater than zero and less than the preset threshold, it may power on the switch lock execution component 102, and control the switch lock execution component 102 to lock the vehicle lock.

Here, when it is detected that the vehicle is illegally moved, the main control circuit 101 cannot determine whether the vehicle is illegally ridden. After the movement speed of the vehicle is determined by the positioning device, the main control circuit 101 may further determine that the vehicle is ridden illegally, thereby improving accuracy for determining that the vehicle is illegally ridden. At the same time, only when it is determined that the movement speed is less than the preset threshold, the switch lock execution component 102 may be controlled to lock the vehicle lock. The preset threshold here may be the safety speed set in advance, even if the vehicle lock is suddenly locked at this safety speed, danger cannot happen to the rider, which may avoid dangerous accidents caused by emergency locking operation after that the vehicle is illegally ridden is determined. In addition, the positioning device may be used for determining the movement of the vehicle and the movement speed of the vehicle, and other sensors are not needed, which may reduce the cost of the vehicle.

Figure 8:
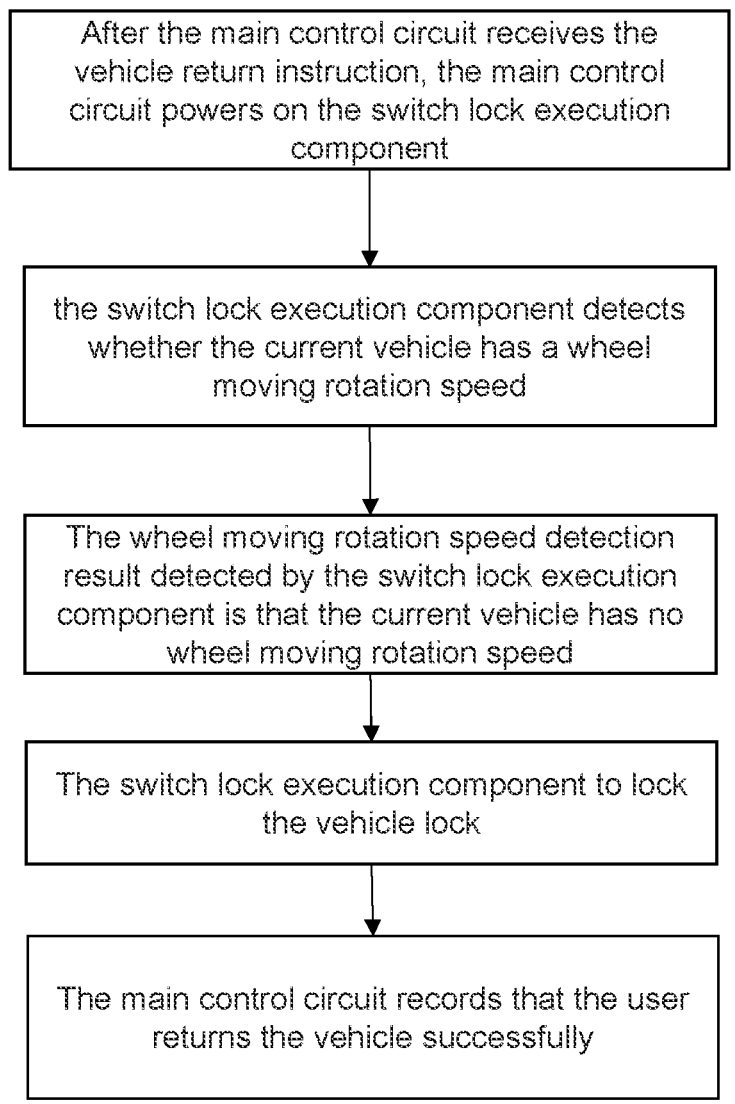
FIG. 8 is a flowchart illustrating an exemplary process for controlling a vehicle lock after a vehicle return instruction is received according to some embodiments of the present disclosure.

In some embodiments, for the process that the main control circuit 101 determines vehicle return by the user, the specific flowchart may be described in FIG. 8. FIG. 8 is a flowchart illustrating an exemplary process for controlling a vehicle lock after a vehicle return instruction is received according to some embodiments of the present disclosure. The main control circuit 101 may receive the vehicle return instruction sent by the user for the current vehicle, which shows that the current vehicle where the main control circuit 101 is located is in the legal riding state. Considering that in the legal riding state, the state of the vehicle lock generally does not need to change, in order to save power consumption of electric power, the vehicle lock may be in a power-off state. After the main control circuit 101 receives the vehicle return instruction, the main control circuit 101 may power on the switch lock execution component 102, so that the switch lock execution component 102 enters the working state. After the switch lock execution component 102 is powered on, the Hall circuit in the switch lock execution component 102 may detect whether the current vehicle has a wheel moving rotation speed, and send a detection result to the main control circuit 101. In response to determining that the wheel moving rotation speed detection result detected by the switch lock execution component 102 is that the current vehicle has no wheel moving rotation speed, the main control circuit 101 may control the switch lock execution component 102 to lock the vehicle lock, and record that the user returns the vehicle successfully. At the same time, in order to save power consumption, after that the user returns the vehicle successfully is recorded, the main control circuit 101 may also power off the switch lock execution component 102 to make it enter a dormant state.

The above is the execution process that the main control circuit 101 verifies whether the user really wants to return the vehicle through the wheel moving rotation speed after the vehicle return instruction sent by the user terminal is received. In some embodiments, in response to determining that the wheel moving rotation speed detection result detected by the switch lock execution component 102 is that the current vehicle has the wheel moving rotation speed, the main control circuit 101 may be configured to record that the current vehicle is in the riding state and keep the current vehicle in the unlocked state after the switch lock execution component 102 of the current vehicle is powered on.

In this case, although the main control circuit 101 receives the vehicle return instruction, after the switch lock execution component 102 is powered on, the main control circuit 101 may determine that the wheel moving rotation speed detection result detected by the switch lock execution component 102 is that the current vehicle has the wheel moving rotation speed, then determine that the user is still in the riding state, but only accidentally triggers the vehicle return key on the user terminal, at this moment, the main control circuit 101 may record that the current vehicle is in the riding state, and cannot record that the user returns the vehicle successfully.

The main control circuit 101 may be configured to power off the switch lock execution component 102 after that the current vehicle is in the riding state is recorded, and then report the power-off failure information if the switch lock execution component 102 cannot be powered off within the first set duration.

Here, in order to save power consumption, the main control circuit 101 may power off the switch lock execution component 102 after that the current vehicle is in the riding state is recorded, so that the switch lock execution component 102 may enter a low power consumption state. At this moment, the Hall circuit in the switch lock execution component 102 does not need to work anymore, and it works again until the main control circuit 101 powers on the switch lock execution component 102 again next time.

In this case, if the main control circuit 101 cannot power off the switch lock execution component 102 within the first set duration, that a power-off failure may occur is determined, and the power-off failure information may be sent to the background server of the shared bicycle at this moment. The power-off failure information here may carry an identification code and geographic position information of the current vehicle, so that the background server may notify relevant personnel for maintenance.

The first set duration here may be 10 s-20 s. For example, when the first set duration here is 15 s, that is, if the switch lock execution component 102 cannot be powered off within 15 s, it can be specifically that the main control circuit 101 may have multiple attempts to power off the switch lock execution component 102 within the 15*s*, but none of them is successful, and then it is determined that a power-off failure may occur.

Figure 9:
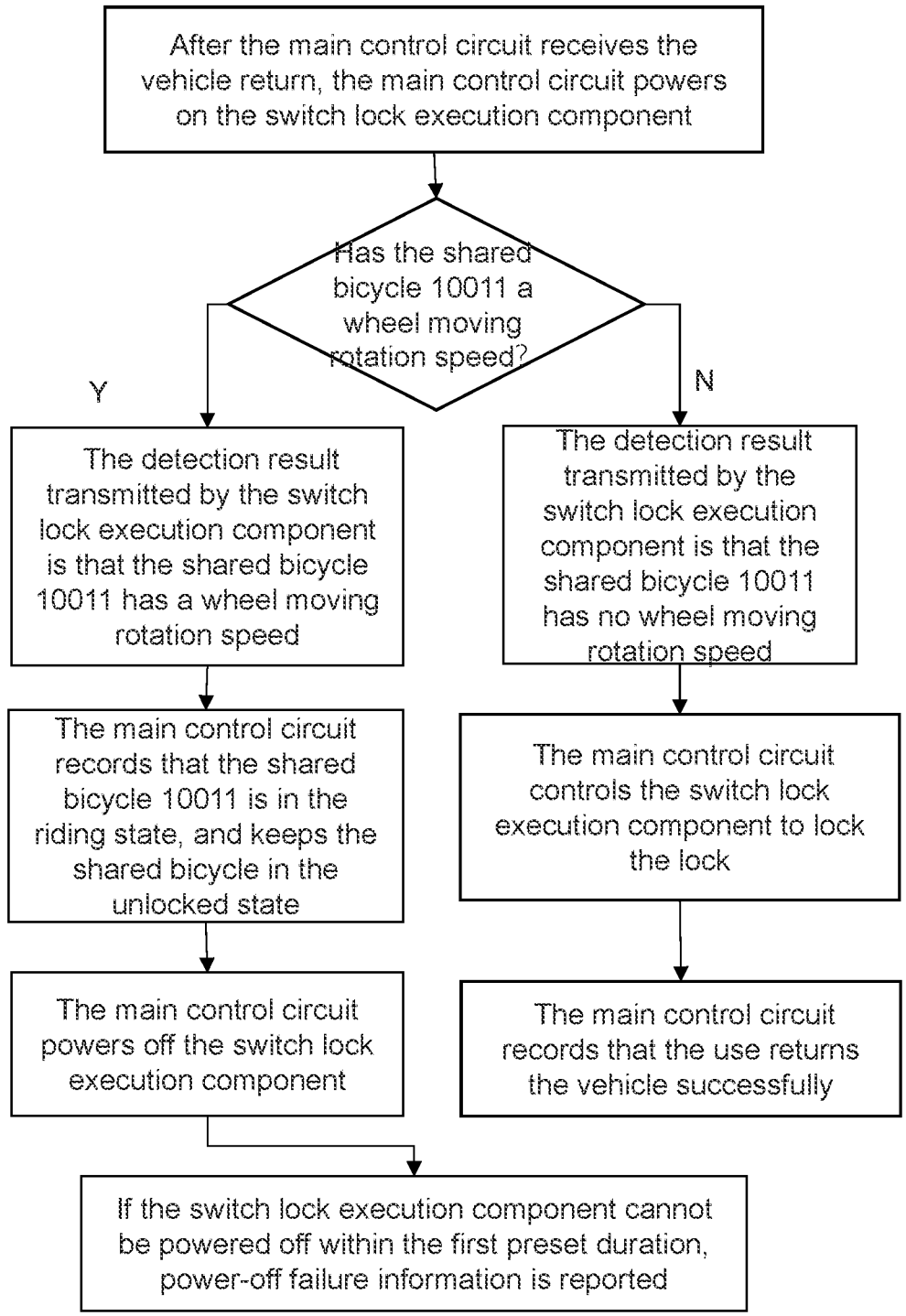
FIG. 9 is a flowchart illustrating an exemplary process for controlling a vehicle lock after a vehicle return instruction is received according to some embodiments of the present disclosure.

As described above, after the main control circuit 101 receives the vehicle return instruction, the main control circuit 101 may have two different processing procedures by determining whether the current vehicle has the wheel moving speed. FIG. 9 is a flowchart illustrating an exemplary process for controlling a vehicle lock after a vehicle return instruction is received according to some embodiments of the present disclosure. As shown in FIG. 9, taking the vehicle being a shared bicycle as an example, the process may be described in the following specific embodiments.

After the main control circuit 101 of the apparatus 100 for controlling a vehicle lock on the shared bicycle with the number 10010 receives the vehicle return instruction sent by the user terminal A, the main control circuit 101 may power on the switch lock execution component 102 of the shared bicycle 10011. Then the Hall circuit in the switch lock execution component 102 may determine whether the shared bicycle 10011 has a wheel moving rotation speed, and transmit a detection result to the main control circuit 101. In response to determining that the detection result transmitted by the switch lock execution component 102 is that the shared bicycle 10011 has no wheel moving rotation speed, the main control circuit 101 may control the switch lock execution component 102 to lock the vehicle lock, and record that the use returns the vehicle successfully. In response to determining that the detection result transmitted by the switch lock execution component 102 is that the shared bicycle 10011 has the wheel moving rotation speed, the main control circuit 101 may record that the shared bicycle 10011 is in the riding state, and keep the shared bicycle in the unlocked state, and then in order to save power consumption, the main control circuit 101 can power off the switch lock execution component 102. If the switch lock execution component 102 cannot be powered off within the first set duration, the switch lock execution component 102 may send power-off failure information to the background server of the shared bicycle.

In some embodiments of the present disclosure, after the vehicle return instruction is received, the main control circuit 101 may first determine whether the current vehicle has the wheel moving speed through the Hall circuit in the vehicle lock execution component, and then control the switch lock execution component 102 to lock the vehicle lock after determining that there is no wheel moving speed and records that the vehicle is returned successfully, which may improve the accuracy for determining whether the user returns the vehicle, and avoid that a dangerous accident happens to the user due to sudden vehicle locking by misjudging that the user returns the vehicle.

The above is the process that the main control circuit 101 judges whether the user is sure to return the vehicle. After determining that the user is sure to return the vehicle, the main control circuit 101 may control the switch lock execution component 102 to lock the vehicle lock, and record that the user returns the vehicle successfully, that is, the bicycle is in the locked state after the legal riding ends.

The main control circuit 101 may be configured to power off the switch lock execution component 102 if it receives information indicating that the vehicle lock has been locked sent by the switch lock execution component 102 after the switch lock execution component 102 to lock the vehicle lock is controlled.

The switch lock execution component 102 may be configured to send the information indicating that the vehicle lock has been locked to the main control circuit 101 when it is detected that the current vehicle is in the locked state after the locking operation is executed.

Here, the main control circuit 101 may control the switch lock execution component 102 to lock the vehicle lock by sending a locking operation instruction to the switch lock execution component 102. After the switch lock execution component 102 receives the locking operation instruction sent by the main control circuit 101, it may execute the locking operation. After the locking operation is executed, the main control circuit 101 may determine whether the current vehicle has been locked. In response to determining that the current vehicle is in the locked state, the main control circuit 101 may send information indicating that the vehicle lock has been locked to the main control circuit 101. The information indicating that the vehicle lock has been locked here may be preset digital information, for example, "1" may show that the vehicle lock has been locked, and "0" may show that the vehicle lock is not locked. Here, the information "1" indicating that the vehicle lock has been locked may be sent to the main control circuit 101.

When the main control circuit 101 receives the information "1" indicating that the vehicle lock has been locked, it may determine that the switch lock execution component 102 has locked the vehicle lock. At this moment, the switch lock execution component 102 is not required to work anymore, in order to save power consumption, the switch lock execution component 102 may be powered off.

The main control circuit 101 may be configured to report power-off failure information if the switch lock execution component 102 cannot be powered off within the first set duration after the information indicating that the vehicle lock has been locked sent by the switch lock execution component 102 is received.

Here, after the main control circuit 101 controls the switch lock execution component 102 to lock the vehicle lock, if the switch lock execution component 102 cannot be powered off within the first set duration, it also determines that a power-off failure may occur. At this moment, the power-off failure information may be sent to the background server of the shared bicycle, similarly, the power-off failure information here may carry an identification code and geographic position information of the current vehicle, so that the background server may notify relevant personnel for maintenance.

The main control circuit 101 may be configured to report locking failure information if it receives information indicating that the vehicle lock cannot be locked sent by the switch lock execution component 102 after the switch lock execution component 102 to lock the vehicle lock is controlled.

The switch lock execution component 102 may be configured to send the information indicating that the vehicle lock cannot be locked to the main control circuit 101 when it detects that the current vehicle is still in the unlocked state after the locking operation is executed. This refers to that after the main control circuit 101 controls the switch lock execution component 102 to lock the vehicle lock, if it receives the information indicating that the vehicle lock cannot be locked sent by the switch lock execution component 102, the main control circuit 101 may determine that the switch lock execution component 102 may have a locking operation failure. The locking failure information may be sent to the background server at this moment, and the locking failure information here may also include an identification code and position information of the current vehicle.

Possible reasons for the locking operation failure here may include that the switch lock execution component 102 is damaged and cannot lock the vehicle lock, that the vehicle lock is damaged and cannot be locked by the switch lock execution component 102, or that the switch lock execution component 102 and the vehicle lock are both damaged.

FIG. 9 above is the flowchart for controlling the vehicle lock after the vehicle return instruction is received. The following may describe the I process for controlling a vehicle lock after a vehicle use request sent by a user terminal is received.

The main control circuit 101 may be configured to power on the switch lock execution component 102 and issue an unlocking instruction when the vehicle use request sent by the user terminal is received. The main control circuit 101 may be also configured to verify identity information of a user carried in the vehicle use request after information indicating that the vehicle lock is currently in an unlocked state sent by the switch lock execution component 102 is received. The main control circuit 101 may be further configured to keep the current vehicle in the unlocked state and record that the current vehicle is in a legal riding state after the verification of identity information of the user passes.

The switch lock execution component 102 may be configured to control the vehicle lock to be unlocked after the unlocking instruction is received, and send information indicating that the vehicle lock is in the unlocked state to the main control circuit 101.

In some embodiments of the present disclosure, the main control circuit 101 may directly receive the vehicle use request sent by the user terminal. The user terminal does not need to send the vehicle use request to the background server. In the vehicle use stage, the user terminal does not need to communicate with the background server anymore to avoid a situation that a communication network breaks down and cannot perform identity verification. The identity information of the user may be directly verified through the main control circuit 101, which may greatly shorten the verification time for using the vehicle.

The main control circuit 101 may be configured to report unlocking failure information when information indicating that the vehicle lock cannot be unlocked sent by the switch lock execution component 102 is received after the switch lock execution component 102 is powered on and the unlocking instruction is issued.

The switch lock execution component 102 may be configured to send the information indicating that the vehicle lock cannot be unlocked to the main control circuit 101 if it detected that the vehicle lock is still in the locked state after the unlocking operation is executed.

The main control circuit 101 may be configured to power off the switch lock execution component 102 after that the vehicle enters a legal riding state is determined, and report power-off failure information if the switch lock execution component 102 cannot be powered off within the first set duration.

The main control circuit 101 may be configured to power on the switch lock execution component 102 when the verification of the identity information of a user does not pass (it can be understood as the vehicle is ridden illegally), and control the switch lock execution component 102 to lock the vehicle lock when a wheel moving rotation speed result of the switch lock execution component 102 is determined to be that a wheel moving rotation speed value of the current vehicle is less than the preset threshold. The preset threshold here may be a safety speed set in advance. Even if the vehicle lock is suddenly locked at this safety speed, danger cannot happen to a rider, which may avoid dangerous accidents caused by emergency locking operation after that the vehicle is illegally ridden is determined. If the detected wheel moving rotation speed value of the current vehicle is greater than or equal to the preset threshold when the verification of the identity information of a user does not pass, the safety of the rider should still be protected to the greatest extent, and locking operation may be still not performed. In the above-mentioned embodiments, when the main control circuit 101 receives the vehicle use request sent by the user terminal, it may first unlock the vehicle, and then verify the identity information of a user, which may shorten the time required for the user to use the vehicle and improve the vehicle use experience of the user. After the vehicle is unlocked, the vehicle may be controlled to be locked when the verification of the identity information of the user does not pass and a travelling speed of the vehicle is low, which may both prevent the vehicle from being used illegally and ensure the safety of the user.

Figure 10:
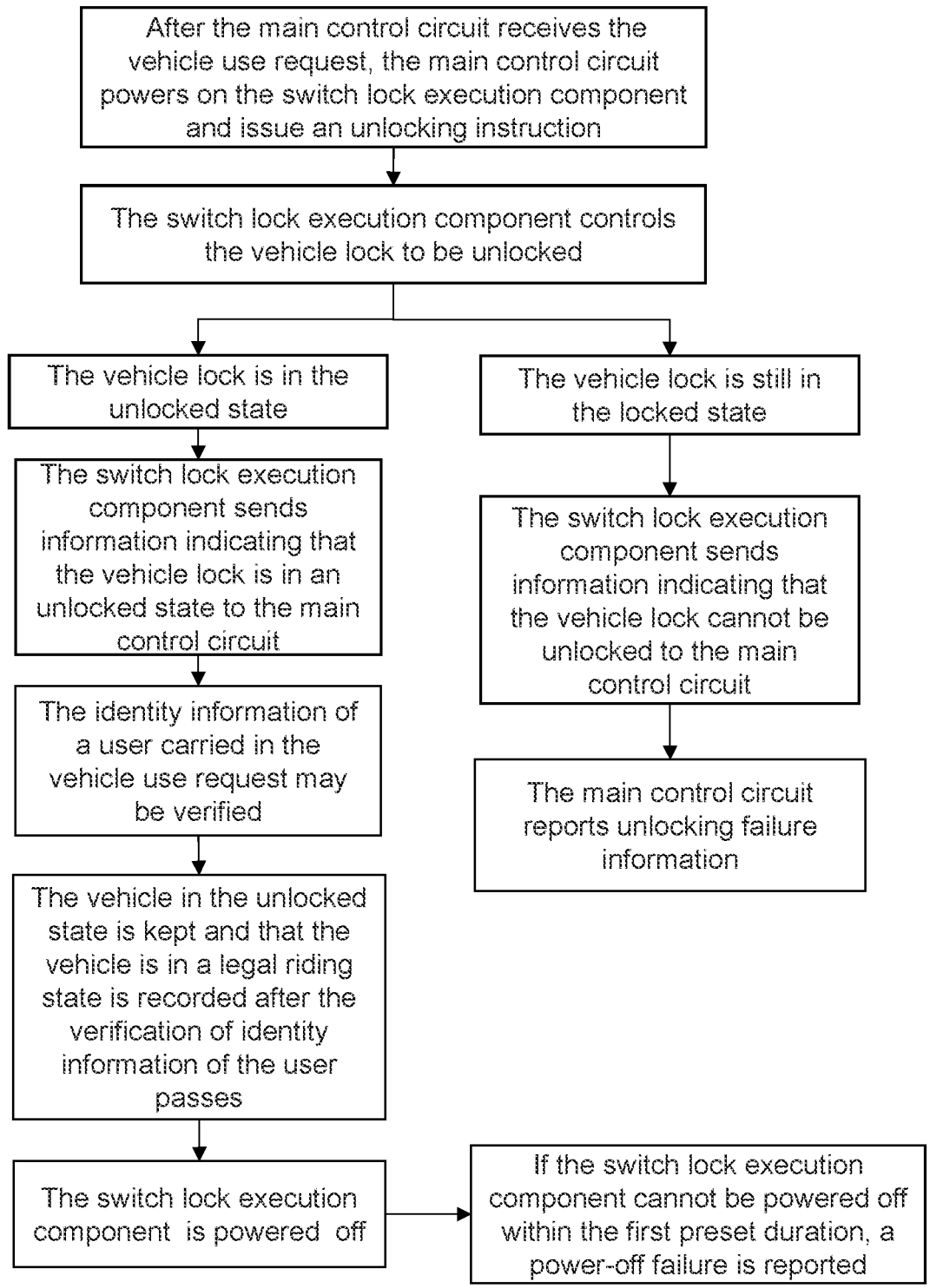
FIG. 10 is a flowchart illustrating an exemplary process for controlling a vehicle lock after a vehicle use request is received according to some embodiments of the present disclosure.

Regarding the above-mentioned process for controlling a vehicle lock after the vehicle use request is received. FIG. 10 is a flowchart illustrating an exemplary process for controlling a vehicle lock after a vehicle use request is received according to some embodiments of the present disclosure. The shared bicycle 10011 may be still taken as an example to illustrate the process.

After the main control circuit 101 receives the vehicle use request, that is, the main control circuit 101 determines that there is a user who wants to use the shared bicycle 10011, the main control circuit 101 may power on the switch lock execution component 102 and issue an unlocking instruction. After the switch lock execution component 102 receives the unlocking instruction, it may control the vehicle lock to be unlocked. After that the vehicle lock has been unlocked is determined, the switch lock execution component 102 may send information indicating that the vehicle lock is in an unlocked state to the main control circuit 101. If the switch lock execution component 102 detects that the vehicle lock is still in a locked state after the vehicle lock is controlled to be unlocked, the switch lock execution component 102 may send information indicating that the vehicle lock cannot be unlocked to the main control circuit 101. At this moment, the main control circuit 101 may report unlocking failure information of the shared bicycle 10011 to the background server, and the unlocking failure information may carry an identification code of the shared bicycle 10011 and position information of the shared bicycle.

If the main control circuit 101 receives information indicating that the vehicle lock is currently in the unlocked state sent by the switch lock execution component 102, it may determine that the shared bicycle 10011 is in a ridable state. After the main control circuit 101 determines that the shared bicycle 10011 is in the ridable state, identity information of a user carried in the vehicle use request may be verified. For example, the identity information of a user may include whether the user is a registered user of this type of shared bicycle and the account balance of the registered user. If the identity information of the user is that the user is the registered user of the shared bicycle, and the corresponding account balance of the registered user is greater than the set value, then the main control circuit 101 may record that the current vehicle is in a legal riding state, that is, the user may legally ride the shared bicycle 10010.

After that the shared bicycle 10010 is in the legal riding state is recorded, that is, the user is in a normal riding process, the switch lock execution component 102 does not need to perform a switch lock operation, in order to save power consumption, the switch lock execution component 102 may be powered off. If the switch lock execution component 102 cannot be powered off within the first set duration, such as 15 seconds, a power-off failure may be reported to the background server.

In some embodiments, if the verification of the identity information of the user does not pass, for example, the user is not a registered user of the shared bicycle, or although the user is a registered user, but the corresponding account balance is less than the set value, the main control circuit 101 may record that the current vehicle is in an illegal riding state. In the illegal riding state, the main control circuit 101 may determine whether the current vehicle has a wheel moving rotation speed. In response to determining that a wheel moving rotation speed value of the current vehicle is less than a preset threshold, the switch lock execution component 102 may be controlled to lock the vehicle lock.

Figure 11:
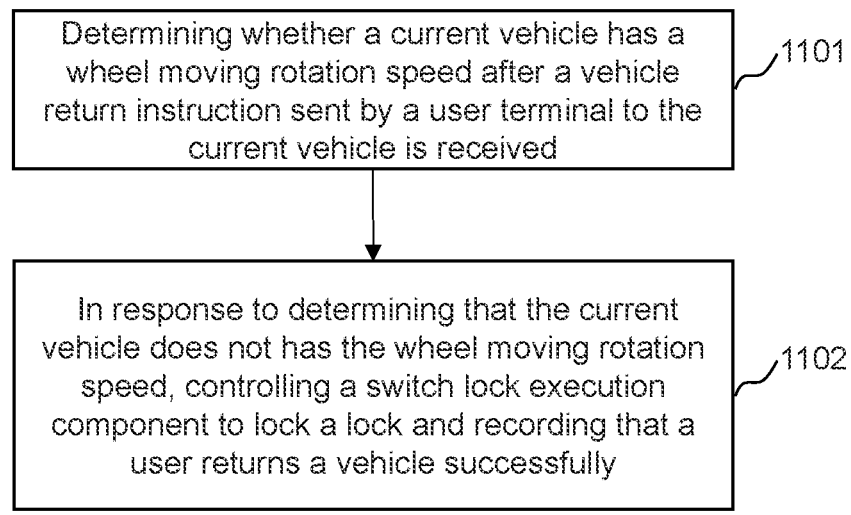
FIG. 11 is a flowchart illustrating an exemplary process for controlling a vehicle lock according to some embodiments of the present disclosure.

Another aspect of the present disclosure further provides a method for controlling a vehicle lock. FIG. 11 is a flowchart illustrating an exemplary process for controlling a vehicle lock according to some embodiments of the present disclosure.

In 1101, whether a current vehicle has a wheel moving rotation speed may be determined after a vehicle return instruction sent by a user terminal to the current vehicle is received.

In 1102, in response to determining that the current vehicle does not has the wheel moving rotation speed, a switch lock execution component 102 may be controlled to lock a vehicle lock and that a user returns a vehicle successfully may be recorded.

In some embodiments, in 1101, after whether the current vehicle has the wheel moving rotation speed is determined, the method for controlling a vehicle lock may further include one or more following operations.

In response to determining that the current vehicle has the wheel moving rotation speed, that the current vehicle is in a riding state may be recorded and the current vehicle may be kept in the unlocked state.

In 1101, the determining of whether the current vehicle has the wheel moving rotation speed after the vehicle return instruction sent by the user terminal to the current vehicle is received may include one or more following operations.

The switch lock execution component 102 may be powered on after the vehicle return instruction sent by the user terminal to the current vehicle is received, and whether the current vehicle has the wheel moving rotation speed may be determined by the powered-on switch lock execution component 102.

The method for controlling a vehicle lock may further include one or more following operations.

The switch lock execution component 102 may be powered off after that the current vehicle is in the riding state is recorded. Power-off failure information may be reported if the switch lock execution component 102 cannot be powered off with a set duration.

The vehicle lock may include a main control circuit (e.g., the main control circuit 101) and a switch lock execution component (e.g., the switch lock execution component 102). Specifically, the main control circuit in the vehicle lock may power on the switch lock execution component of the current vehicle after the vehicle return instruction sent by the user terminal to the current vehicle is received. The switch lock execution component may determine whether the current vehicle has a wheel moving rotation speed after the switch lock execution component is powered on, and transmit a detection result to the main control circuit. In response to determining that the received wheel moving rotation speed detection result is that the current vehicle has no wheel moving rotation speed, the main control circuit may control the switch lock execution component to lock the vehicle lock and record that the user returns the vehicle successfully.

In addition, in response to determining that the wheel moving rotation speed detection result detected by the switch lock execution component 102 is that the current vehicle has the wheel moving rotation speed, after the main control circuit powers on the switch lock execution component of the current vehicle, the main control circuit may record that the current vehicle is in the riding state, and keep the current vehicle in an unlocked state.

In addition, after the main control circuit 101 records that the current vehicle is in the riding state, the main control circuit 101 may power off the switch lock execution component. If the switch lock execution component cannot be powered off within a first set duration, the main control circuit 101 may report power-off failure information.

After locking operation is executed, the method for controlling a vehicle lock may further include one or more following operations.

The switch lock execution component may be powered off when that the current vehicle is in a locked state is determined.

In some embodiments, the method for controlling a vehicle lock may further include one or more following operations.

Power-off failure information may be reported if the switch lock execution component cannot be powered off within a first set duration.

In some embodiments, the method for controlling a vehicle lock may further include one or more following operations.

The vehicle lock may be controlled to be unlocked when a vehicle use request sent by the user terminal is received. Identity information of a user carried in the vehicle use request may be verified. The current vehicle may be kept in the unlocked state and that the current vehicle is in a legal riding state may be recorded after the verification of the identity information of the user passes.

In some embodiments, the above-mentioned method for controlling a vehicle lock may further include reporting unlocking failure information if the locking operation fails.

In some embodiments, the above-mentioned method for controlling a vehicle lock may further include one or more following operations.

The switch lock execution component may be powered off after the current vehicle enters the legal riding state. The power-off failure information may be reported if the switch lock execution component cannot be powered off within a set duration.

In some embodiments, the above-mentioned method for controlling a vehicle lock may further include one or more following operations.

Whether the current vehicle has a wheel moving rotation speed may be determined when the verification of the identify information of the user does not pass. In response to determining that a wheel moving rotation speed value of the current vehicle is less than the preset threshold, the switch lock execution component may be controlled to lock the vehicle lock.

Specifically, when the main control circuit receives the vehicle use request sent by the user terminal, it may power on the switch lock execution component and issue the unlocking instruction. After the switch lock execution component receives the unlocking instruction, it may control the vehicle lock to be unlocked and send information indicating that the vehicle lock is in the unlocked state to the main control circuit 101. After information indicating that the vehicle lock is currently in the unlocked state sent by the switch lock execution component is received, the main control circuit may verify the identity information of a user carried in the vehicle use request. The main control circuit may keep the current vehicle in the unlocked state and record that the current vehicle is in a legal riding state after the verification of the identity information of the user passes. If the verification of the identity information of the user does not pass, whether the current vehicle has the wheel moving rotation speed may be determined. In response to determining that the wheel moving rotation speed value of the current vehicle is less than the preset threshold, the switch lock execution component may be controlled to lock the vehicle lock.

In addition, the switch lock execution component may send information indicating that the vehicle lock cannot be unlocked to the main control circuit if it still detects that the vehicle lock is in the locked state after the unlocking operation is executed according to the received unlocking instruction. The main control circuit may report the unlocking failure information when the information indicating that the vehicle lock cannot be unlocked sent by the switch lock execution component is received.

In addition, after the main control circuit determines that the current vehicle enters the legal riding state, it may power off the switch lock execution component. If the switch lock execution component cannot be powered off within the first set duration, the main control circuit may report the power-off failure information.

Another aspect of the present disclosure further provides a vehicle. The vehicle is provided with the apparatus for controlling a vehicle lock in any embodiment described above.

The vehicle here can be a bicycle, an electric car and other vehicles that can be provided with the apparatus for controlling a vehicle lock mentioned in the above-mentioned embodiment.

The embodiments of the present disclosure provide the apparatus and method for controlling a vehicle lock, and the vehicle, the main control circuit 101 in the apparatus for controlling a vehicle lock may first power on the switch lock execution component 102 of the current vehicle after the vehicle return instruction sent by the user terminal to the current vehicle is received. Then, the main control circuit 101 may control the switch lock execution component 102 to lock the vehicle lock and record that the user returns the vehicle successfully when it determines that the wheel moving rotation speed detection result detected by the switch lock execution component 102 is that the current vehicle does not have the wheel moving rotation speed. Here, the main control circuit 101 first determines that there is no wheel moving rotation speed before that the user returns the vehicle successfully is recorded, which may avoid the situation that the user accidentally touches a vehicle return key on the user terminal and then sends out a vehicle return instruction in the riding process. Therefore, the embodiments of the present disclosure may improve the accuracy of recording that the user returns the vehicle, thereby reducing the probability of occurrence of dangerous events caused by misjudgment of a vehicle return success.

Those skilled in the art can clearly understand that for the convenience and concise description, the specific working process of the apparatus described above can refer to the corresponding process in the method embodiment, which will not be repeated in the present disclosure. In the several embodiments provided by the present disclosure, it should be understood that the disclosed apparatus and method may be implemented in other ways. The apparatus embodiments described above are merely illustrative. For example, the division of modules is only logical function division, and there may be other division ways in actual implementation. For another example, multiple modules or components may be combined or integrated into another system, or some features can be ignored or not implemented. In addition, the displayed or discussed mutual coupling or direct coupling or communication connection may be indirect coupling or communication connection through some communication interfaces, apparatuses, or modules, and may be in electrical, mechanical, or other forms.

The modules described as separate components may be or may not be physically separated, and the components displayed as modules may be or may not be physical units, that is, they may be located in one place, or they may be distributed to multiple network units. Some or all the units may be selected according to actual needs to achieve the objectives of the solutions of the embodiments.

In addition, various functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a non-volatile computer-readable storage medium executable by a processor. Based on this understanding, the technical solution of the present disclosure essentially or the part that contributes to the existing technology or the part of the technical solution can be embodied in the form of a software product, and the computer software product is stored in one storage medium, and includes several instructions to be configured to making a computer device (which may be a personal computer, a server, or a network device, etc.) execute all or part of the steps of the methods described in the various embodiments of the present disclosure. The aforementioned storage medium includes a U disk, a mobile hard disk, a ROM, a RAM, a magnetic disk or an optical disk or various media that can store program codes.

The above are only specific embodiments of the present disclosure, but the scope of protection of the present disclosure is not limited herein. Any person skilled in the art can easily think of changes or substitutions within the technical scope disclosed in the present disclosure, and it should be covered within the scope of protection of the present disclosure. Therefore, the protection scope of the present disclosure shall be subject to the protection scope of the claims.

What is claimed is:

1. An apparatus for controlling a vehicle lock, comprising:
a main control circuit, configured to determine a movement speed of a vehicle when the vehicle is in an unlocked state and is moved illegally, and power on a switch lock execution component and control the switch lock execution component to lock a vehicle lock when the movement speed is greater than zero and less than a preset threshold, wherein the main control circuit is further configured to power on the switch lock execution component and issue an unlocking instruction when a vehicle use request sent by a user terminal is received; the main control circuit is further configured to verify identity information of a user carried in the vehicle use request after information indicating that the vehicle lock is currently in the unlocked state sent by the switch lock execution component is received; and the main control circuit is further configured to keep the vehicle in the unlocked state and record that the vehicle is in a legal riding state after the verification of identity information of the user passes; and
the switch lock execution component, configured to execute a locking operation under control of the main control circuit after the switch lock execution component is powered on, wherein the switch lock execution component is further configured to detect whether the vehicle lock is in a locked state or the unlocked state after the unlocking instruction is received; and in response to determining that the vehicle lock is in the unlocked state, the switch lock execution component is further configured to send the information indicating that the vehicle lock is currently in the unlocked state to the main control circuit; and in response to determining that the vehicle lock is in the locked state, the switch lock execution component is further configured to send information indicating that the vehicle lock is in the unlocked state to the main control circuit after the vehicle lock is controlled to be unlocked.

2. The apparatus of claim 1, wherein the movement speed of the vehicle is determined via a positioning device.

3. The apparatus of claim 1, wherein:
the main control circuit is further configured to power off the switch lock execution component if information indicating that the vehicle lock has been locked sent by the switch lock execution component is received after the switch lock execution component is controlled to lock the vehicle lock;
the switch lock execution component is further configured to send the information indicating that the vehicle lock has been locked to the main control circuit when the vehicle is in the locked state after the locking operation is executed.

4. The apparatus of claim 3, wherein:
the main control circuit is further configured to report power-off failure information if the switch lock execution component cannot be powered off within a set duration after the information indicating that the vehicle lock has been locked sent by the switch lock execution component is received.

5. The apparatus of claim 1, wherein:
the main control circuit is further configured to report locking failure information if information indicating that the vehicle lock cannot be locked sent by the switch lock execution component is received after the switch lock execution component is controlled to lock the vehicle lock;
the switch lock execution component is further configured to send the information indicating that the vehicle lock cannot be locked to the main control circuit when the vehicle is still in the unlocked state after the locking operation is executed.

6. The apparatus of claim 1, wherein:
the main control circuit is further configured to report unlocking failure information when information indicating that the vehicle lock cannot be unlocked sent by the switch lock execution component is received after the switch lock execution component is powered on and the unlocking instruction is issued;
in response to determining that the vehicle lock is in the locked state, the switch lock execution component is further configured to send the information indicating that the vehicle lock cannot be unlocked to the main control circuit if the vehicle lock is still in the locked state after the unlocking operation is executed.

7. The apparatus of claim 1, wherein:
the main control circuit is further configured to power off the switch lock execution component after the vehicle is in the legal riding state, and report power-off failure information if the switch lock execution component cannot be powered off within a set duration.

8. The apparatus of claim 7, wherein:
the main control circuit is further configured to record that a user returns the vehicle successfully and keep the vehicle in the unlocked state if the movement speed of the vehicle is zero after a vehicle return instruction sent by the user terminal to the vehicle is received; and
the main control circuit is further configured to record that the vehicle is in a riding state and keep the vehicle in the unlocked state if the movement speed of the vehicle is not zero after the vehicle return instruction sent by the user terminal to the vehicle is received.

9. A method for controlling a vehicle lock, comprising:
determining a movement speed of a vehicle when the vehicle is in an unlocked state and is moved illegally; and
executing a locking operation for a vehicle lock when the movement speed is greater than zero and less than a preset threshold, wherein the method further comprises:
powering on a switch lock execution component when a vehicle use request sent by a user terminal is received; and
determining whether the vehicle lock is in a locked state or the unlocked state via the powered-on switch lock execution component;
in response to determining that the vehicle lock is in the unlocked state, verifying identity information of a user carried in the vehicle use request, and keeping the vehicle in the unlocked state and recording that the vehicle is in a legal riding state after the verification of the identity information of the user passes; and
in response to determining that the vehicle lock is in the locked state, executing an unlocking operation.

10. The method of claim 9, wherein the determining a movement speed of a vehicle when the vehicle is in an unlocked state and is moved illegally comprises:
determining the movement speed of the vehicle via a positioning device when the vehicle is moved illegally;
after the locking operation is executed, the method further comprises:
powering off the switch lock execution component.

11. The method of claim 10, wherein the method further comprises:
reporting power-off failure information if the switch lock execution component cannot be powered off within a set duration.

12. The method of claim 9, wherein, after the locking operation is executed, the method further comprises:
reporting locking failure information if the locking operation fails.

13. The method of claim 9, wherein, the method further comprises:
reporting unlocking failure information if the vehicle lock is still in the locked state after the unlocking operation is executed.

14. The method of claim 9, wherein the determining whether the vehicle lock is in a locked state or the unlocked state via the powered-on switch lock execution component, comprises:
powering off the switch lock execution component after the vehicle is in the legal riding state, and reporting power-off failure information if the switch lock execution component cannot be powered off with a set duration.

15. The method of claim 9, wherein, the method further comprises:
determining the movement speed of the vehicle when a vehicle return instruction sent by the user terminal is received, recording that the user returns the vehicle successfully and keeping the vehicle in the unlocked state if a current movement speed of the vehicle is zero.

16. The method of claim 15, wherein after the movement speed of the vehicle is determined when the vehicle return instruction sent by the user terminal is received, the method further comprises:

recording that the vehicle is in a riding state and keeping the vehicle in the unlocked state if the movement speed of the vehicle is not zero.

17. The method of claim 16, wherein the determining the movement speed of the vehicle when a vehicle return instruction sent by the user terminal is received, comprises:

determining the movement speed of the vehicle via a positioning device when the vehicle return instruction sent by the user terminal is received;

after recording that the vehicle is in the riding state, the method further comprises:

powering off the switch lock execution component, and reporting power-off failure information if the switch lock execution component cannot be powered off within a set duration.

18. A vehicle, wherein, the vehicle is provided with the apparatus of claim 1.

19. The apparatus of claim 1, wherein the preset threshold is a safety speed value determined according to multiple tests performed in advance.

20. The method of claim 9, wherein the preset threshold is a safety speed value determined according to multiple tests performed in advance.

\* \* \* \* \*